(12) United States Patent
Leandro et al.

(10) Patent No.: US 9,671,501 B2
(45) Date of Patent: Jun. 6, 2017

(54) GLOBAL NAVIGATION SATELLITE SYSTEMS (GNSS) POSITIONING USING PRECISE SATELLITE DATA

(71) Applicant: Trimble Navigation Limited, Sunnyvale, CA (US)

(72) Inventors: Rodrigo Leandro, Ottobrunn (DE); Nicholas Charles Talbot, Ashburton (AU)

(73) Assignee: Trimble Inc., Sunnyvale, CA (US)

( * ) Notice: Subject to any disclaimer, the term of this patent is extended or adjusted under 35 U.S.C. 154(b) by 926 days.

(21) Appl. No.: 14/025,110

(22) Filed: Sep. 12, 2013

(65) Prior Publication Data
US 2014/0085139 A1    Mar. 27, 2014

Related U.S. Application Data

(60) Provisional application No. 61/706,023, filed on Sep. 26, 2012.

(51) Int. Cl.
*G01S 19/44*    (2010.01)
*G01S 19/42*    (2010.01)
(Continued)

(52) U.S. Cl.
CPC ............... *G01S 19/44* (2013.01); *G01S 19/03* (2013.01); *G01S 19/40* (2013.01); *G01S 19/42* (2013.01); *G01S 19/43* (2013.01)

(58) Field of Classification Search
CPC .......... G01S 19/01; G01S 19/03; G01S 19/38; G01S 19/39; G01S 19/40; G01S 19/41;
(Continued)

(56) References Cited

U.S. PATENT DOCUMENTS 5,361,212 A * 11/1994 Class ................. G01S 5/0009
                                                    244/114 R
5,786,790 A *  7/1998 Abbott ................. G01S 19/41
                                                    342/357.31
(Continued)

FOREIGN PATENT DOCUMENTS

EP         1678517 B1    12/2011
WO     2011/034616 A2     3/2011
(Continued)

*Primary Examiner* — Bernarr Gregory
(74) *Attorney, Agent, or Firm* — Kilpatrick Townsend & Stockton LLP

(57) ABSTRACT

Method to estimate parameters derived at least from GNSS signals useful to determine a position, including obtaining at least one GNSS signal observed at a GNSS receiver from each of a plurality of GNSS satellites; receiving global correction information useful to correct at least the obtained GNSS signals from a first set of GNSS satellites, wherein the global correction information includes correction information which is independent from the position to be determined; receiving local correction information useful to correct at least the obtained GNSS signals from a second set of GNSS satellites, wherein the local correction information includes correction information which is dependent on the position to be determined; processing the obtained GNSS signals from the first set of GNSS satellites by using the global correction information; and processing the obtained GNSS signals from the second set of GNSS satellites by using the local correction information.

25 Claims, 15 Drawing Sheets

(51) Int. Cl.
*G01S 19/43* (2010.01)
*G01S 19/03* (2010.01)
*G01S 19/40* (2010.01)
*G01S 19/00* (2010.01)

(58) Field of Classification Search
CPC .......... G01S 19/42; G01S 19/43; G01S 19/44;
G01S 5/0009; G01S 5/009; G01S 19/07;
G01S 19/13; G01S 19/14; G01S 19/23;
G01S 19/235
See application file for complete search history.

(56) References Cited

U.S. PATENT DOCUMENTS

| | | | | |
|---|---|---|---|---|
| 5,828,336 A * | 10/1998 | Yunck | ................ | G01S 19/07 342/357.31 |
| 5,982,324 A * | 11/1999 | Watters | ................ | G01S 19/41 342/357.29 |
| 6,128,501 A * | 10/2000 | Ffoulkes-Jones | ....... | G01S 19/07 342/357.41 |
| 6,285,315 B1 * | 9/2001 | Pratt | ................ | G01S 19/07 342/357.42 |
| 6,618,004 B2 * | 9/2003 | Fenton | ................ | G01S 19/41 342/357.21 |
| 6,950,059 B2 * | 9/2005 | Rapoport | ................ | G01S 19/44 342/357.27 |
| 7,248,211 B2 * | 7/2007 | Hatch | ................ | G01S 19/41 342/357.31 |
| 7,362,265 B2 * | 4/2008 | Weill | ................ | G01S 19/42 342/357.25 |
| 8,140,223 B2 * | 3/2012 | Whitehead | ................ | G01S 19/14 701/41 |
| 8,174,437 B2 * | 5/2012 | Whitehead | ................ | G01S 19/41 342/357.24 |
| 8,265,826 B2 * | 9/2012 | Feller | ................ | G01S 19/14 701/41 |
| 8,466,835 B2 * | 6/2013 | Elwell, Jr. | ................ | G01S 19/235 342/357.42 |
| 8,570,216 B2 * | 10/2013 | Gutt | ................ | G01S 19/41 342/357.44 |
| 8,922,429 B2 * | 12/2014 | Fujisawa | ................ | G01S 19/43 342/357.77 |
| 2005/0264444 A1 | 12/2005 | Sharpe et al. | | |

FOREIGN PATENT DOCUMENTS

| | | |
|---|---|---|
| WO | 2012/128979 A2 | 9/2012 |
| WO | 2012/151006 A1 | 11/2012 |

* cited by examiner

GLOBAL NAVIGATION SATELLITE SYSTEMS (GNSS) POSITIONING USING PRECISE SATELLITE DATA

CROSS-REFERENCE TO RELATED APPLICATIONS

This application claims priority to U.S. Provisional Application No. 61/706,023, filed Sep. 26, 2012, the entire contents of which are incorporated herein by reference in their entirety for all purposes.

FIELD OF TECHNOLOGY

The invention relates to global navigation satellite systems (GNSS) position estimation methods and apparatuses. The fields of application of the methods and apparatuses include, but are not limited to, navigation, map-making, land surveying, civil engineering, agriculture, disaster prevention and relief, and scientific research.

BACKGROUND

Global navigation satellite systems include Global Positioning System (GPS) (United States), GLONASS (Russia), Galileo (Europe), and COMPASS (China) (systems in use or in development). A GNSS typically uses a plurality of satellites orbiting the earth. The plurality of satellites forms a constellation of satellites. A GNSS receiver detects a code modulated on an electromagnetic signal broadcasted by a satellite. The code is also called a ranging code. Code detection includes comparing the bit sequence modulated on the broadcasted signal with a receiver-side version of the code to be detected. Based on the detection of the time of arrival of the code for each of a series of the satellites, the GNSS receiver estimates its position. Positioning includes, but is not limited to, geolocation, i.e. the positioning on the surface of the Earth.

An overview of GPS, GLONASS and Galileo is provided for instance in sections 9, 10 and 11 of Hofmann-Wellenhof B., et al., *GNSS, Global Navigation Satellite Systems, GPS, GLONASS, Galileo, & more*, Springer-Verlag, Vienna, Austria, 2008, (hereinafter referred to as "[1]"), which is hereby incorporated by reference in its entirety.

Positioning using GNSS signal codes provides a limited accuracy, notably due to the distortion the code is subject to upon transmission through the atmosphere. For instance, the GPS includes the transmission of a coarse/acquisition (C/A) code at 1575.45 MHz, the so-called L1 frequency. This code is freely available to the public, in comparison to the Precise (P) code, which is reserved for military applications. The accuracy of code-based positioning using the GPS C/A code is approximately 15 meters, when taking into account both the electronic uncertainty associated with the detection of the C/A code (electronic detection of the time of arrival of the pseudorandom code) and other errors including those caused by ionospheric and tropospheric effects, ephemeris errors, satellite clock errors and multipath propagation.

An alternative to positioning based on the detection of a code is positioning based on carrier phase measurements. In this alternative approach or additional approach (ranging codes and carrier phases can be used together for positioning), the carrier phase of the GNSS signal transmitted from the GNSS satellite is detected, not (or not only) the code modulated on the signal transmitted from the satellite.

The approach based on carrier phase measurements has the potential to provide much greater position precision, i.e. up to centimeter-level or even millimeter-level precision, compared to the code-based approach. The reason may be intuitively understood as follows. The code, such as the GPS C/A code on the L1 band, is much longer than one cycle of the carrier on which the code is modulated. The position resolution may therefore be viewed as greater for carrier phase detection than for code detection.

However, in the process of estimating the position based on carrier phase measurements, the carrier phases are ambiguous by an unknown number of cycles. The phase of a received signal can be determined, but the cycle cannot be directly determined in an unambiguous manner. This is the so-called "integer ambiguity problem", "integer ambiguity resolution problem" or "phase ambiguity resolution problem".

GNSS observation equations for code observations and for carrier phase observations are for instance provided in [1], section 5. An introduction to the GNSS integer ambiguity resolution problem is provided in [1], section 7.2.

Patent application US 2005/0264444 A1 relates to a system combining, for determining the position of a receiver, the use of differential carrier-phase measurements with a reference station to perform real-time kinematic (RTK) positioning and the use of a wide-area differential GPS (WADGPS) technique (carrier-phase differential method). The WADGPS includes a network of reference stations in communication with a computational center, or processing hub, to compute error corrections based on the known locations of the reference stations.

According to the teaching in US 2005/0264444 A1, paragraph [0012], "when the communication link for the RTK navigation is available, the position, velocity and time (PVT) outputs of the user receiver can be obtained using the RTK system, while the WADGPS system runs in the background and its outputs are constantly initialized to agree with the outputs from the RTK system. When the communication link for the RTK navigation is lost, or when the user receiver wanders too far away from the reference station in the RTK system, the PVT outputs of the user receiver can be obtained using the WADGPS system, which has been initialized while the RTK was operating".

There is a need for improving the implementation of positioning systems based on GNSS carrier phase measurements, to obtain a precise estimation of the receiver position in a quick, stable and user-friendly manner.

SUMMARY

The present invention aims at meeting the above-mentioned needs. In particular, the invention aims at improving the implementation of the methods of the prior art with the goal of obtaining rapidly a stable and more precise solution.

The invention includes methods and apparatuses as defined in the claims.

In one embodiment of the invention, when a global correction stream is available for correcting the GNSS observations made by a receiver in relation to a first set of visible GNSS satellites and when a local correction stream or a regional correction stream is available for correcting the GNSS observations made by the receiver in relation to a second set of visible GNSS satellites, wherein the first set of visible satellites and the second set of visible satellites are not the same, the GNSS observations from the satellites for which a correction stream or a regional correction stream is available are supplemented with GNSS observations from the satellites for which only a global correction stream is available but no local or regional correction data is available.

An RTK solution is therefore produced using GNSS observations from all visible satellites or at least from more satellites than from those for which a local correction stream or regional correction stream is available.

BRIEF DESCRIPTION OF THE DRAWINGS

Embodiments of the present invention shall now be described, in conjunction with the appended drawings in which.

DETAILED DESCRIPTION

The present invention shall now be described in conjunction with specific embodiments. The specific embodiments serve to provide the skilled person with a better understanding, but are not intended to in any way restrict the scope of the invention, which is defined by appended claims. In particular, the embodiments described independently throughout the description can be combined to form further embodiments to the extent that they are not mutually exclusive.

Figure 9:
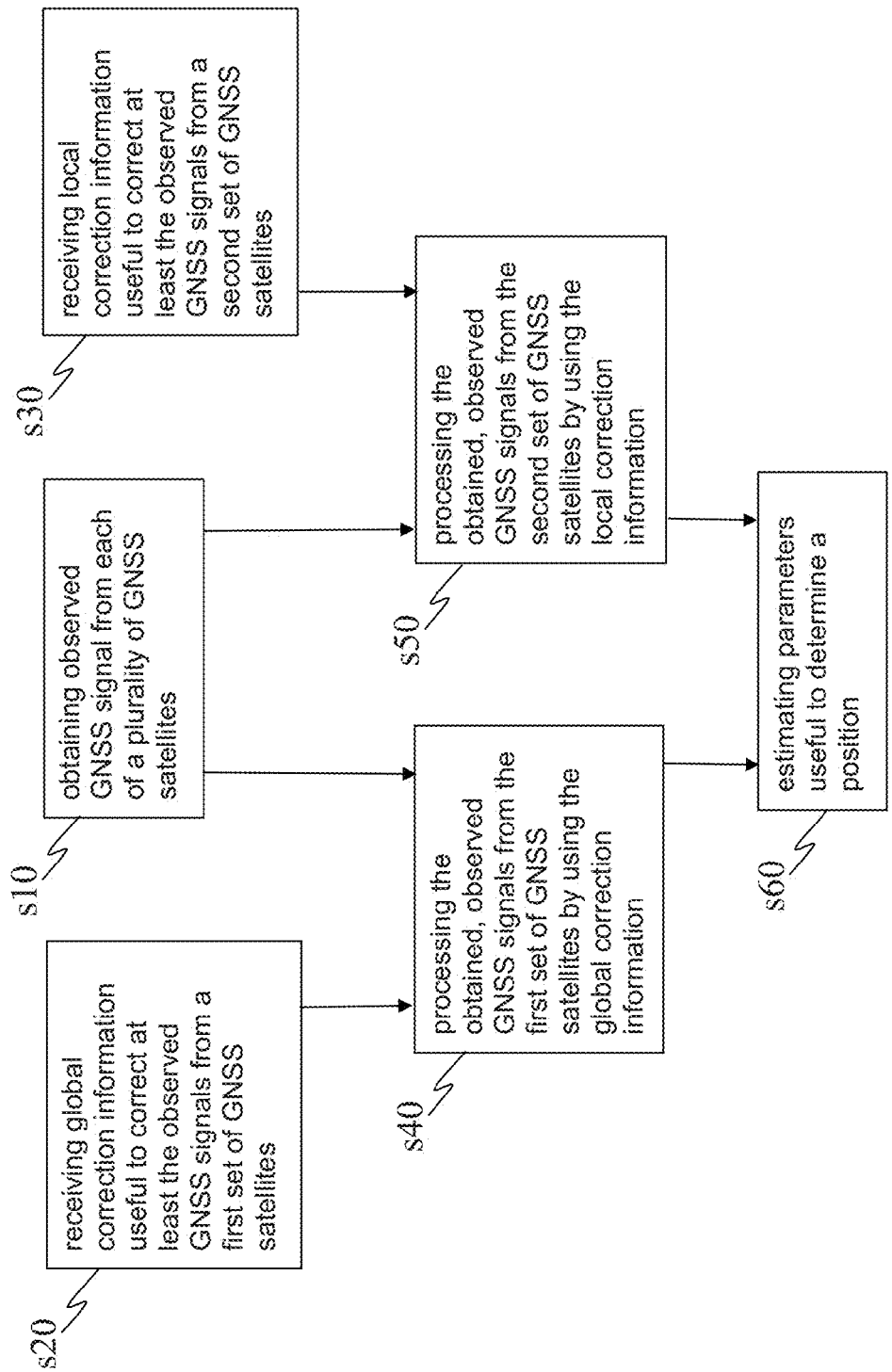
FIG. 9 is a flowchart of a method in one embodiment of the invention.

The flowchart of FIG. 9 illustrates one embodiment of the invention. In this embodiment, the method serves to estimate parameters which are derived at least from GNSS signals and which are useful to determine a position, such as the position of a rover. The method may eventually lead to determining or estimating the rover position.

The method includes the steps of: (i) obtaining, in step s10, at least one GNSS signal received and observed, i.e. tracked, at a GNSS receiver from each of a plurality of GNSS satellites; (ii) receiving, in step s20, global correction information useful to correct at least the obtained GNSS signals from a first set of GNSS satellites among the plurality of GNSS satellites, wherein the global correction information includes correction information which is independent from the position to be determined; (iii) receiving, in step s30, local correction information useful to correct at least the obtained GNSS signals from a second set of GNSS satellites among the plurality of GNSS satellites, wherein the local correction information includes correction information which is dependent on the position to be determined; (iv) processing, in step s40, the obtained GNSS signals from the first set of GNSS satellites by using the global correction information; and (v) processing, in step s50, the obtained GNSS signals from the second set of GNSS satellites by using the local correction information. Furthermore, the first set of GNSS satellites is different from the second set of GNSS satellites.

Based on the outcome of processing steps s40 and s50, parameters are estimated s60, which are useful to determine or estimate a position, such as the position of a rover or more specifically the position of the antenna thereof. For instance, the estimated parameters may indicate the most probable number of cycles along a carrier separating a GNSS satellite from the GNSS receiver, i.e. the estimated parameters may be the resolved integer ambiguity. In other words, the output of the method need not be the position itself but parameters that may be used, for instance by another entity (such as a processing entity on a server dedicated to such task), to estimate or determine the rover position.

The method may be performed by the rover receiver itself or by another processing entity remotely located from the rover receiver. The rover receiver may send data representing the GNSS observations to the processing entity which is then in charge of obtaining (step s10) and processing (steps s40, s50) the GNSS observations.

The rover receiver may receive at least one GNSS signal from each of a plurality of GNSS satellites by observing the ranging codes carried on a particular frequency by each of the plurality of GNSS satellites, or by observing the phase of the carrier emitted on a particular frequency by each of the plurality of GNSS satellites, or by observing both the ranging codes and the carrier phases.

In addition to receiving the GNSS signals, the method receives, in step s20, global correction information for a first set of GNSS satellites. The global correction information includes for instance information regarding an estimated clock error, an estimated orbital error, an estimated ranging code bias, or an estimated carrier phase bias or any combination of these pieces of information, for each of the satellites of the first set of GNSS satellites. The ranging code bias can be generally defined as a differential delay between different measurement types observed by the GNSS receiver. Accounting for ranging biases assures the consistency between the different observation types jointly used in the data processing. The carrier phase bias can be defined in a similar manner as the ranging code bias, with the addition that these can also contain fractional parts of the carrier phase measurement, which might need to be accounted for in order for the phase measurement to yield into integer carrier phase ambiguity parameters. The global correction information need not however be of the same type for each of the satellites of the first set of satellites. For instance, an estimated satellite clock error and an estimated satellite orbital error may be received for all satellites of the first set of satellites, and an estimated ranging code bias and an estimated carrier phase bias may be received only for some of the satellites of the first set of satellites.

The global correction information may more generally be seen as comprising information useful to correct GNSS observations made by a receiver, wherein the correction information is applicable to, i.e. usable for a receiver no matter where the receiver is located on earth. In particular, the global correction information may represent properties of the GNSS satellites that may be taken into account and used to improve the estimation of the receiver position.

The global correction information may be computed or prepared by a (typically world-wide) network of reference receivers which positions are precisely known on a global reference frame (i.e., coordinate system). The data from the reference receivers is transmitted over the internet to a processing center, where the data is collected, synchronized and processed. During the data processing a variety of products can be generated, including e.g. satellite orbits, satellite clock errors, GNSS measurement biases, and atmospheric effects. The products (or corrections) are then sent to the rover receivers on the field. The transmission to the rover can take place in different forms, of which the most commonly used are the internet and satellite links. For a descriptive example of a global GNSS positioning correction service see e.g. WO 2011-034616 A2, the content of which is hereby incorporated by reference.

In addition to receiving the GNSS signals and the global correction information for a first set of GNSS satellites, the method also receives, in step s30, local correction information for a second set of GNSS satellites. The local correction information may be computed or prepared by a reference receiver located in the vicinity of the receiver. A reference receiver is normally considered to be in the vicinity of the rover when the distance between the reference and rover receivers does not exceed 20 to 30 kilometers. However this distance can be extended to as far as both receivers observe a minimum number of common satellites, as long as the de-correlation on the atmospheric effects and orbit errors are properly taken into account, yielding into distances of few hundreds of kilometers. In case of a local receiver network, typical distances between rover and reference station can reach about 100 kilometers or more. The local correction information may also be computed or prepared by a set of reference receivers forming a network of reference receivers covering a region around the receiver which position is to be determined or estimated. The local correction information may in particular include information usable in combination with the GNSS observations made by the receiver in order to cancel some locally-dependent terms in the GNSS observations equations. For instance, the satellite clock error may be completely cancelled by combining the GNSS observations made by the receiver and the local correction information. To a certain extent, the delays induced by the troposphere may also be cancelled if the reference receivers are located in the vicinity of the receiver which position is to be determined or estimated.

The processing, in step 40, of the obtained GNSS signal using the global correction information may include the estimation of the receiver clock error, receiver position, the tropospheric delay at the receiver location, carrier-phase ambiguities, biases, and other atmospheric parameters, depending on the type of information (correction) contained in the global correction stream. The type of filters that are used in the signal processing also vary according to the contents of the correction stream, where commonly at least a geometric filter is included. A geometric filter is used to estimate geometry-dependent quantities, such as the receiver position and tropospheric delay.

The processing, in step 50, of the obtained GNSS signal using the local correction information may include a geometry filter, an ionospheric filter and a code carrier filter, as will be explained in more detail below.

The processing using the local correction information and the processing using the global correction information are similar as far as most of the geometric part (i.e., rover position) of the signal goes, but can differ on several aspects, such as the quality of the atmospheric correction contained in the stream and the realization of the GNSS time system. These differences have to be properly taken into account in order to successfully combine the different types of corrections into the same signal processor.

The outcome of both processing operations (steps s40, s50) is then combined to determine the position of the rover or parameters useful to determine the position of the rover. Steps s40 and s50 can take different forms, such as:

a) Running as complete processors outputting rover positions that are combined together as a final step;

b) Running as data preparation steps to make the GNSS signal ready to be jointly processed in further step (i.e. s60) in order to obtain the rover position and other parameters.

In one embodiment, the method is such that the local correction information includes at least one of (a) raw data of a single reference receiver; (b) synthetic or semi-synthetic raw data generated for a position, being the position of a virtual reference station (VRS), near the position to be determined; and (c) raw data from a network of reference stations. A virtual reference station is typically generated for a position up to a few meters away from the receiver. However in theory a VRS would still be valid for processing the rover data even if it is generated for a position further away from the rover, e.g. at least a few hundreds of meters.

The location of a reference receiver, also called reference station, is typically known very precisely, such as within two (2) centimeters. Each reference station includes at least one antenna and receives and observes GNSS signals from the GNSS satellites or at least some of them. The observation of GNSS signals by a reference receiver which position is precisely known, or by a plurality of reference receivers, enables to quickly deduce information regarding the deviation of the satellites compared to their announced orbits, regarding the extent of the clock error, and regarding the offset of the ranging code and carrier at the satellite transmitter compared to the expected and configured timing.

In one embodiment, the method is such that receiving local correction information includes receiving local correction information from a local source, such as for instance a reference station and a reference station network.

In one embodiment, the global correction information includes at least one of satellite clock correction; satellite orbit correction; and satellite bias. The satellite bias is either the ranging code bias or the carrier bias compared to the expected timing according to the global GNSS configuration.

In one embodiment, the method uses carrier phase measurements of the GNSS signals.

In one embodiment, processing the obtained GNSS signals from the first set of GNSS satellites by using the global correction information includes: inputting at least part of the global correction information to a geometry filter configured to output a candidate set of integer ambiguities. A geometry filter is a filter that takes as input GNSS observations (pseudorange, carrier-phase) and is used to estimate geometric terms related to GNSS positioning, such as receiver position, tropospheric delay, carrier-phase ambiguities, and the like.

In one embodiment, processing the obtained GNSS signals from the second set of GNSS satellites by using the local correction information includes: inputting at least part of the local correction information to at least one ionospheric filter configured to output a candidate set of integer ambiguities. An ionospheric filter is a filter that takes as input GNSS observations (pseudorange, carrier-phase) and is used to estimate ionospheric terms related to GNSS observables, such as ionospheric delay and carrier-phase ambiguities.

In one embodiment, processing the obtained GNSS signals from the second set of GNSS satellites by using the local correction information includes: inputting at least part of the local correction information to at least one code carrier filter configured to output a candidate set of integer ambiguities. A code carrier filter is a filter that takes as input GNSS observations in the form of differences between code (pseudorange) and carrier-phase, and is used to estimate terms related to GNSS positioning carrier-phase ambiguities.

For a more detailed description regarding the geometry, ionospheric and code carrier filter implementation and the nature of the processing performed by them (e.g. output from the filters, combination of the outputs, etc.) see for instance the Factorized Multi-Carrier Ambiguity Resolution (FAMCAR) patent EP 1 678 517 B1.

In one embodiment, the method uses carrier phase measurements of the GNSS signals and the candidate sets of integer ambiguities are processed to estimate parameters useful to determine the position.

In one embodiment, the first set includes the plurality of GNSS satellites from which a GNSS signal is received and observed, i.e. tracked, by the receiver. Although the first set (the satellites for which global correction information is received) may include all visible satellites (visible by the receiver), it is advantageous to take into account for processing the GNSS observations using the global correction information only the GNSS observations and global correction information from the satellites for which no local correction information is available. This is because the use of the local correction information usually leads to much better results than the use of the global correction information. The use of global correction information alone to correct the GNSS observations from the receiver which position needs to be determined requires a long convergence usually using floating solutions for the integer ambiguities, typically taking about 30 minutes for the initialization compared to a few seconds for the initialization using local correction information.

In one embodiment, the second set includes fewer than the plurality of GNSS satellites from which a GNSS signal is received and observed, i.e. tracked, by the receiver. In other words, local correction information is not available for all satellites.

Figure 10:
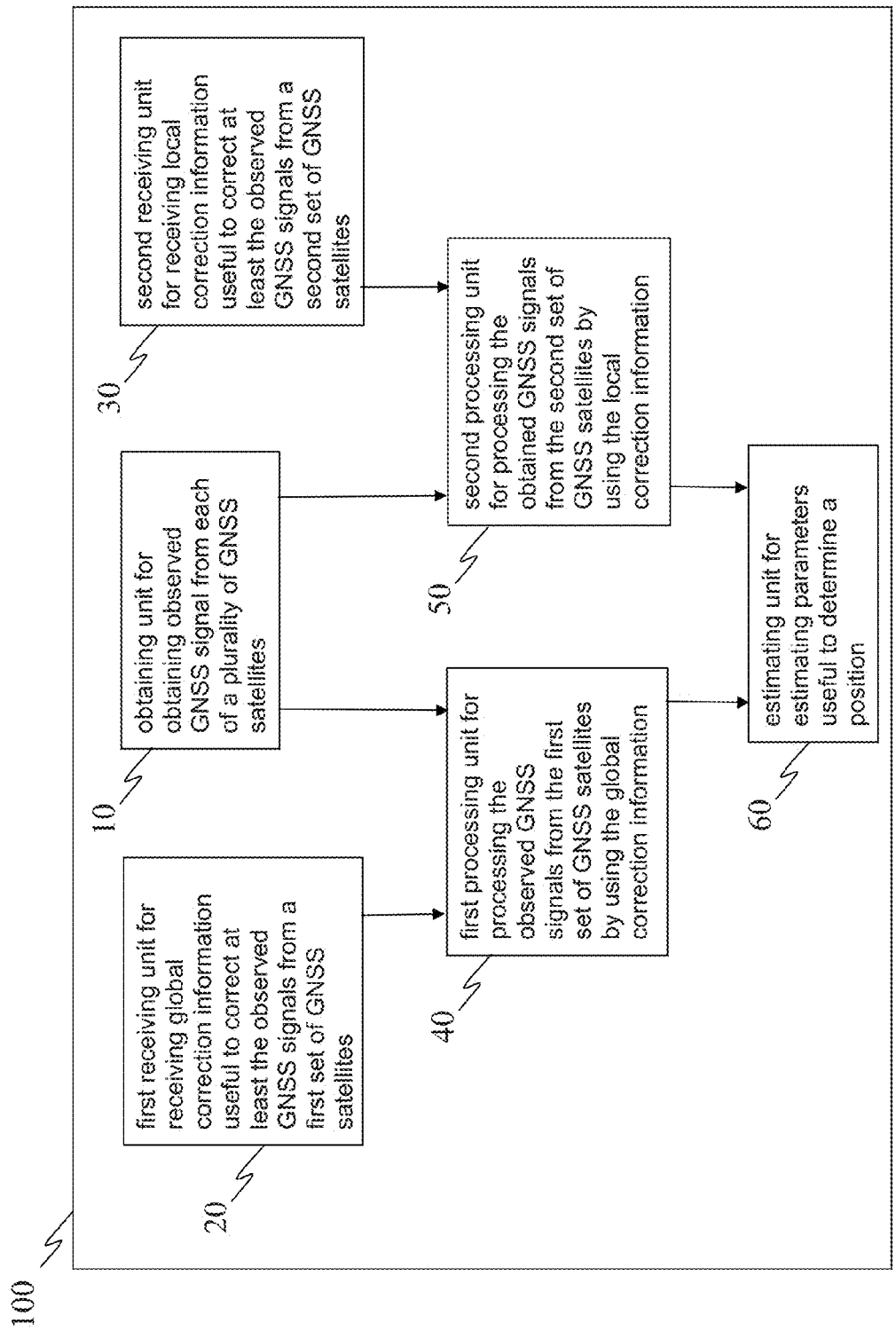
FIG. 10 schematically illustrates an apparatus in one embodiment of the invention.

FIG. 10 schematically illustrates an apparatus in one embodiment of the invention. The apparatus 100 is configured to estimate parameters derived at least from global navigational satellite system (GNSS) signals useful to determine a position, such as a rover receiver position. The apparatus 100 includes an obtaining unit 10, a first receiving unit 20, a second receiving unit 30, a first processing unit 40, a second processing unit 50, and an estimating unit 60. The obtaining unit 10 is configured for obtaining at least one GNSS signal observed at a GNSS receiver from each of a plurality of GNSS satellites. The first receiving unit 20 is configured for receiving global correction information useful to correct at least the obtained GNSS signals from a first set of GNSS satellites among the plurality of GNSS satellites, wherein the global correction information includes correction information which is independent from the position to be determined. The second receiving unit 30 is configured for receiving local correction information useful to correct at least the obtained GNSS signals from a second set of GNSS satellites among the plurality of GNSS satellites, wherein the local correction information includes correction information which is dependent on the position to be determined. The first processing unit 40 is configured for processing the obtained GNSS signals from the first set of GNSS satellites by using the global correction information. The second processing unit 50 is configured for processing the obtained GNSS signals from the second set of GNSS satellites by using the local correction information. The first set of GNSS satellites is different from the second set of GNSS satellites. The estimating unit 60 is configured for estimating parameters useful to determine a position such as the position of a rover receiver.

Figure 15:
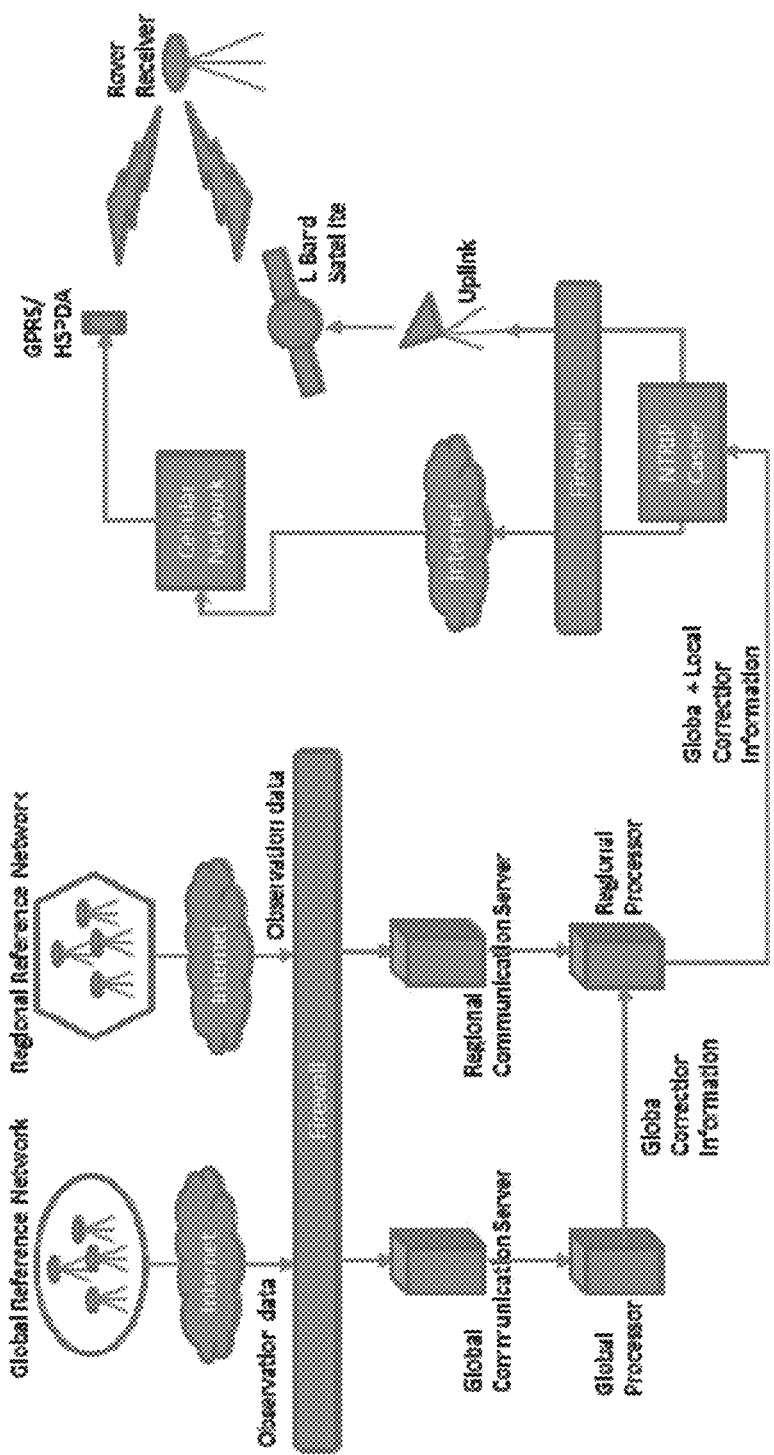
FIG. 15 schematically illustrates, for a better understanding of the context of the invention, a flowchart in where the data communication flow is described.

FIG. 15 schematically illustrates a flowchart of the data communication links in one embodiment of the invention. The collected observation data from the monitoring reference stations of the global and the regional reference network are transmitted via the Internet to the corresponding global and regional communication servers. These communication servers route the observation data to the global and regional processors. The global processor computes global correction information (precise orbits, clocks and observation biases). The regional processor uses also as input this global correction information and computes local correction information (e.g. local atmospheric phenomena). The generated correction information data stream is then transferred to a NTRIP caster, which routes it either to a satellite uplink station and then uploaded to an L-Band satellite or to the Internet. Thereafter the data stream is transmitted to the rover receivers via a satellite link or via the cellular network. This information can be then used together with the rover observation data in a positioning engine in order to estimate and/or determine a position such as the position of a rover receiver.

Let us now further explain the context of the invention for a better understanding thereof.

Global correction streams are streams of correction data relating to GNSS satellites, the streams including especially, but not necessarily only, accurate orbital data and accurate satellite clock data to improve the positioning solution. The global correction streams are called "global" because the correction data that these streams include relate to the satellites and are therefore globally useful to the determination of any position on earth. In that sense, global correction data contrasts with local or regional correction data, which are specific to a particular position or region on earth. Local or regional correction data may for instance account for local or regional atmospheric phenomena.

With the modernization of the technology behind the global correction streams (i.e., improvement on the quality of available satellite orbits, clocks and measurement biases) used for instance for precise point positioning (PPP) applications, the usage of global correction streams is becoming more frequent, including its use to augment local/regional reference systems such as single reference station (single baseline application) and network real-time kinematic (RTK). US patent application 2005/0264444 A1, already referred to above, relates to the usage of a PPP stream for transitioning the positioning mode from single baseline (SBL) to PPP in order to overcome reference data outages (if for instance the receiver rover moves too far from the reference station). A patent application discloses using a "precise-clock-based" delta-phase approach to overcome the same problem (international application PCT/US2012/29694, filed on Mar. 19, 2012, which is hereby incorporated by reference). Furthermore, another patent application discloses a transition between positioning modes via a geometric ambiguity bridge, as part of the bridging patent application (international application PCT/US2012/28670, filed on Mar. 11, 2012, which is hereby incorporated by reference).

According to one embodiment of the invention, the global correction stream is used in a solution including blending the GNSS observations from satellites for which a local/regional correction stream is available such as through the use of a virtual reference station (VRS) or synthetic reference station (SRS) network, with the GNSS observations from satellites for which only the global correction stream is available. As network RTK availability might depend on the status of the network ambiguity fixing and visibility, it is advantageous to supplement the usable GNSS observations from the constellation of satellites for which local or regional correction data is available with GNSS observations from the satellites for which only a global correction stream is available but no local or regional correction data is available. Since global correction streams typically provide corrections for all satellites, this technique assures that an RTK solution can be produced taking into account all satellites in view (i.e., visible by the receiver rover), even if the reference station/network does not provide local correction information for all of them.

Let us first discuss, to further introduce the context and background of the invention, the usage of reference streams in high accuracy positioning.

Figure 1:
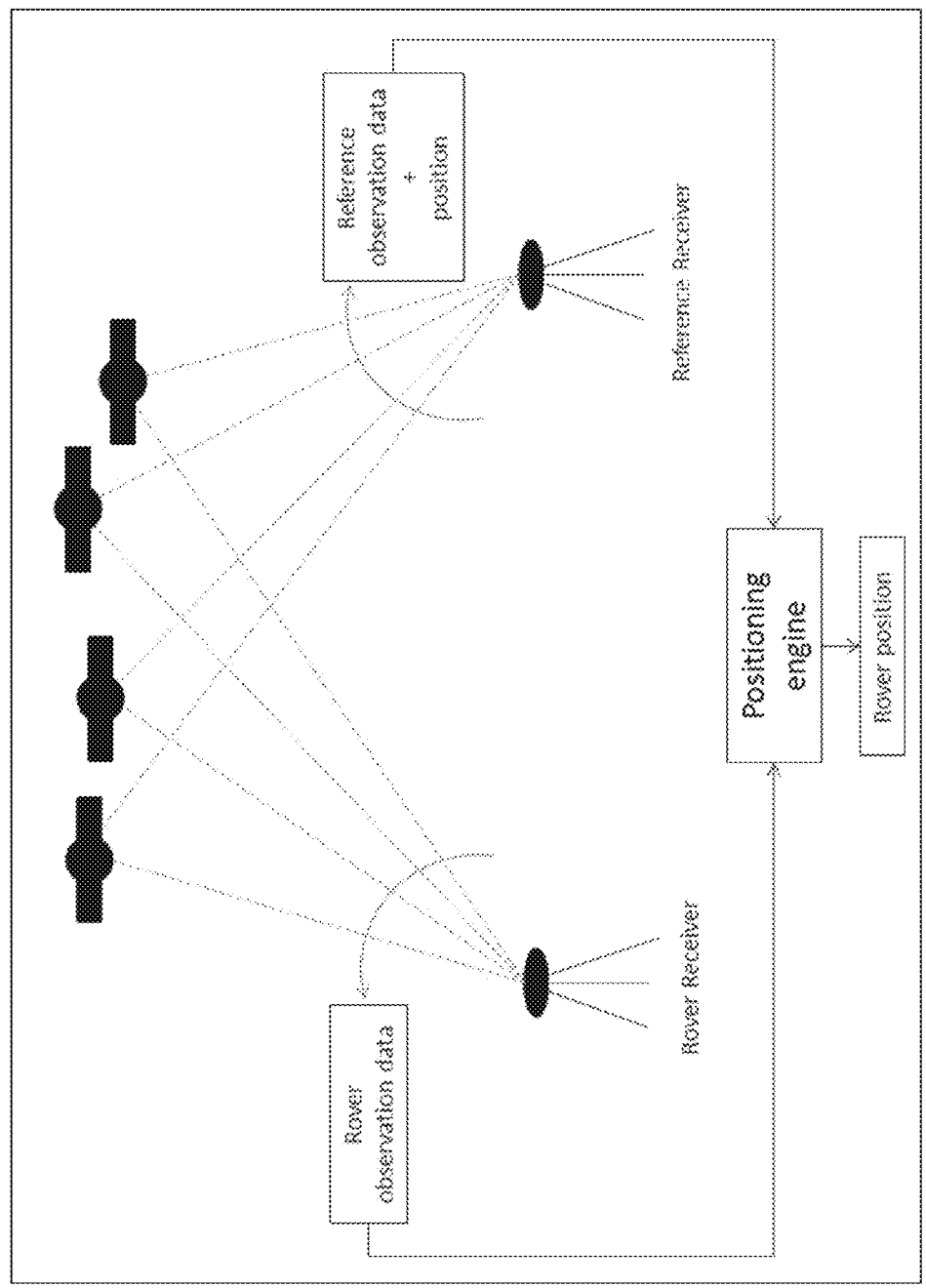
FIG. 1 schematically illustrates, for a better understanding of the context of the invention, a positioning engine making use of rover receiver observation data and reference receiver observation data from the same satellites, in order to determine the position of the rover receiver.
Figure 2:
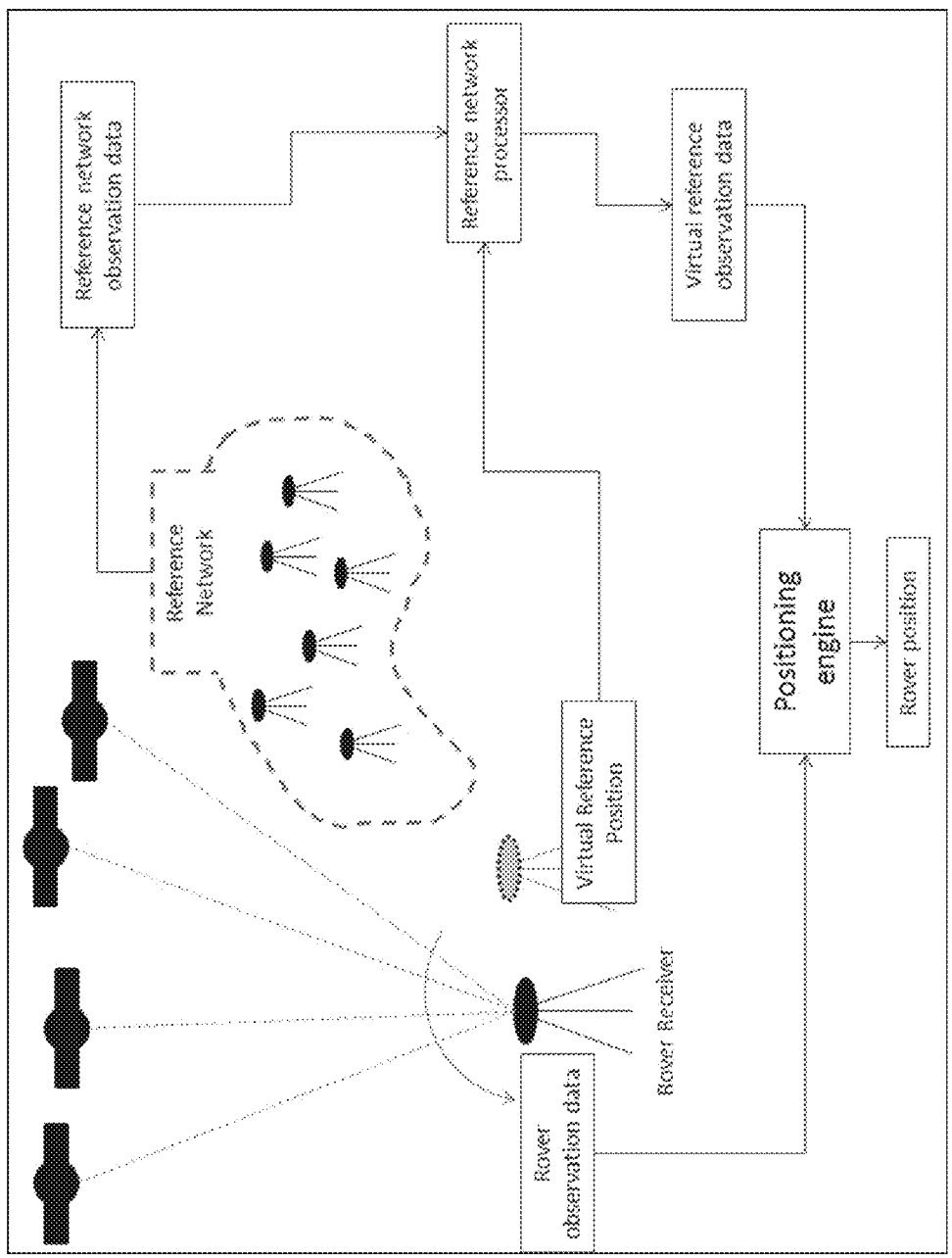
FIG. 2 schematically illustrates, for a better understanding of the context of the invention, a positioning engine making use of rover receiver observation data and virtual reference receiver observation data computed by a reference network processor based on the observations made by a network of reference stations, in order to determine the position of the rover receiver.
Figure 3:
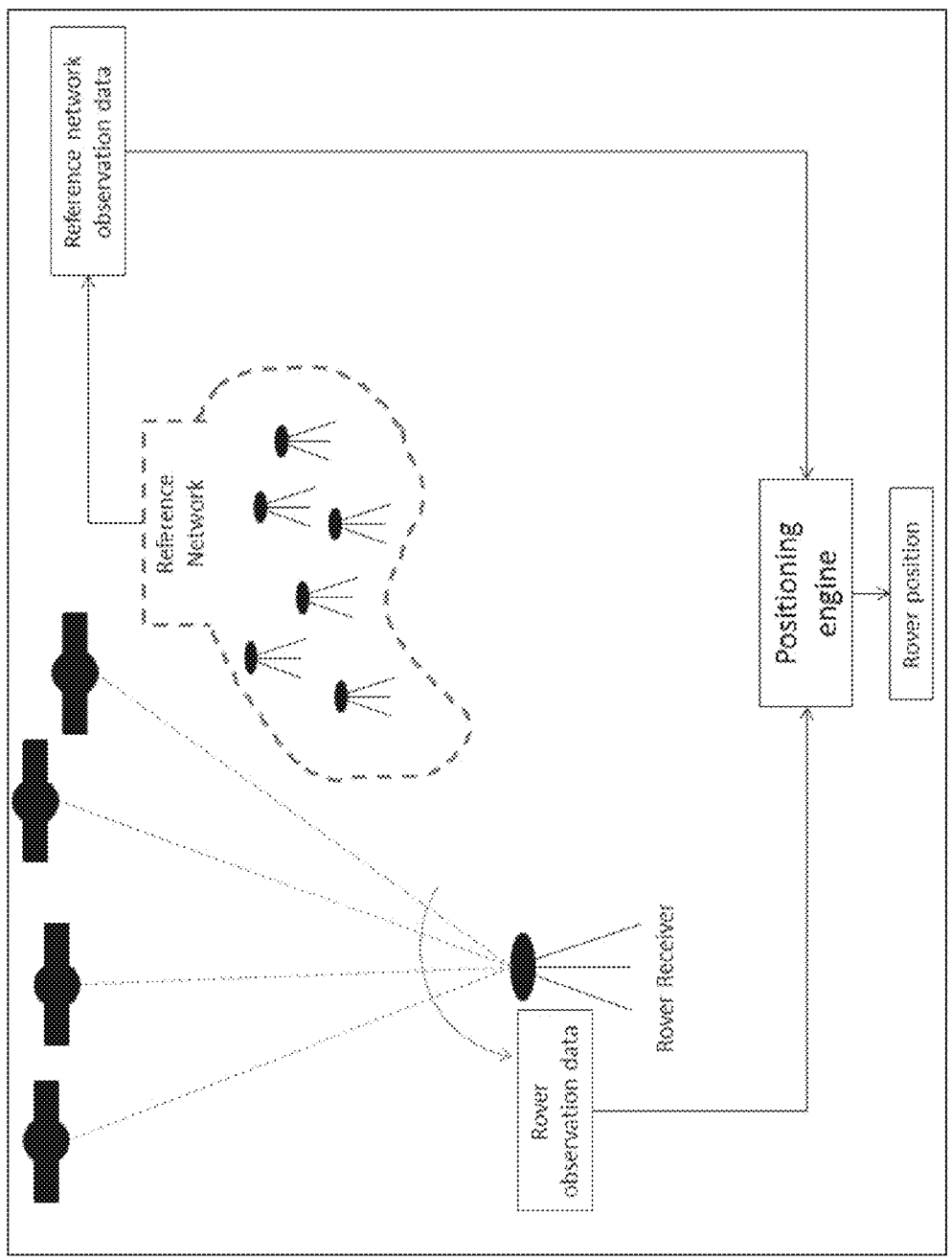
FIG. 3 schematically illustrates, for a better understanding of the context of the invention, a positioning engine making use of rover receiver observation data and observation data obtained by a network of reference stations, in order to determine the position of the rover receiver.
Figure 4:
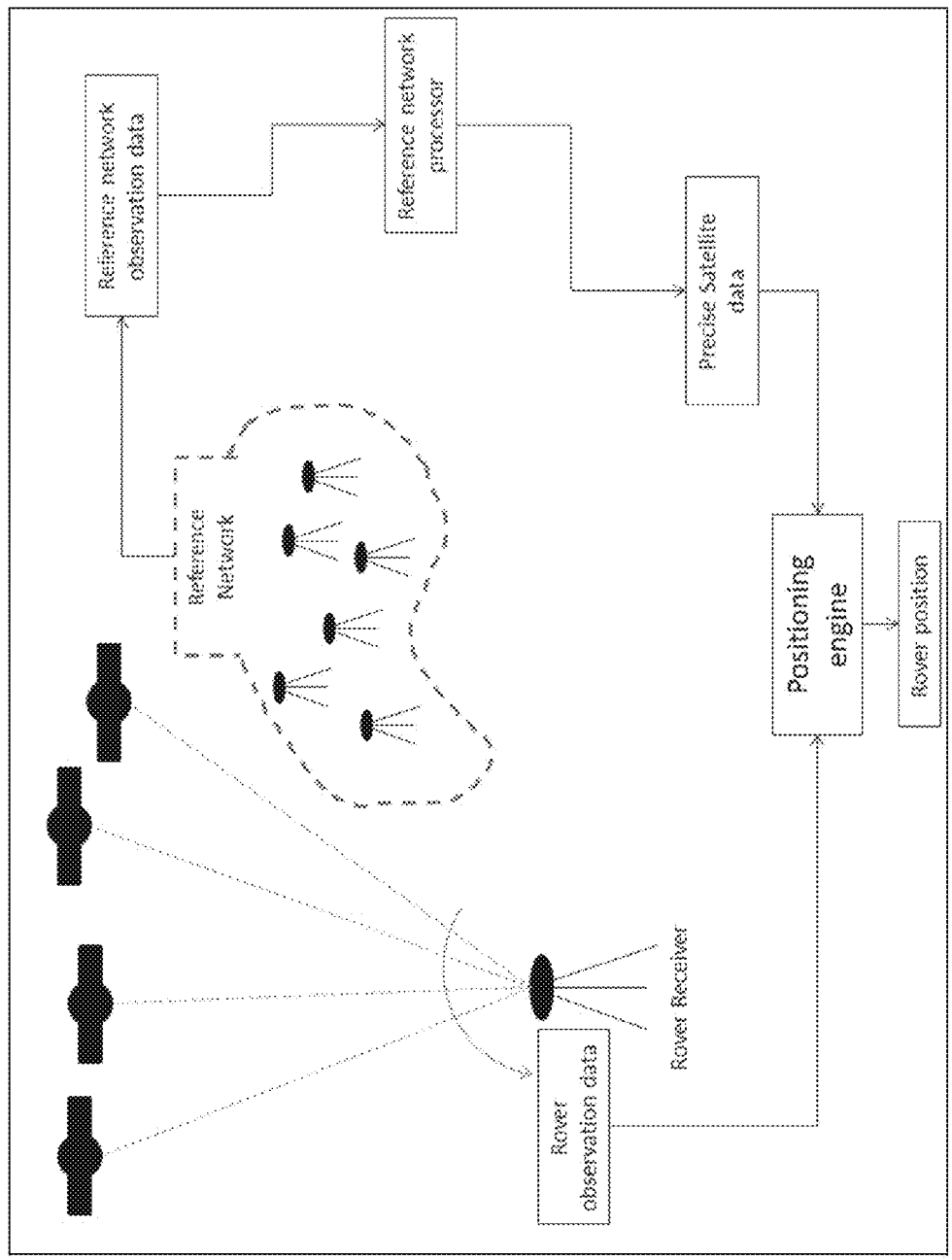
FIG. 4 schematically illustrates, for a better understanding of the context of the invention, a positioning engine making use of rover receiver observation data and precise satellite data, including for instance precise satellite clock error and orbital error information, in order to determine the position of the rover receiver.
Figure 5:
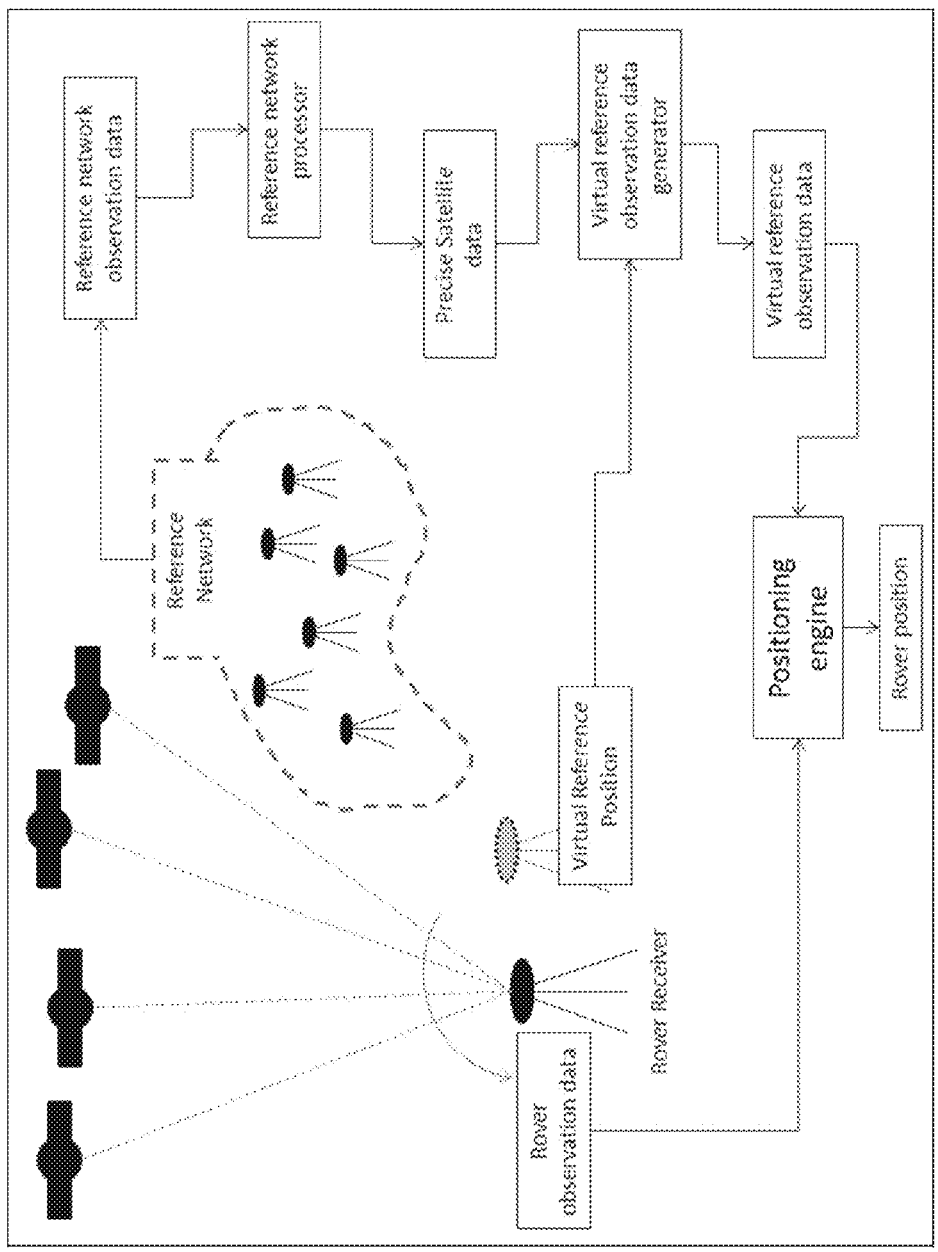
FIG. 5 schematically illustrates, for a better understanding of the context of the invention, a positioning engine making use of rover receiver observation data and virtual reference receiver observation data computed by a virtual reference observation data generator based on a network of reference stations and involves the intermediate computation of precise satellite data, including for instance precise satellite clock error and orbital error information, in order to determine the position of the rover receiver.

High accuracy GNSS positioning (i.e., obtaining positions with accuracy of up to a few centimeters) has been traditionally performed using not only data from the rover receiver for which the antenna position has to be determined, but also from one or more reference receivers. The data from the reference receiver(s) is used to generate a reference correction stream that is then sent to the rover receiver, or made available for post-processing (the post-processing may be performed in a server which is remotely located from the rover receiver). This reference stream can take a variety of different forms, such as:

a) The reference stream can take the form of raw data (compressed or not) of a single reference receiver. FIG. 1 schematically illustrates the use of raw data of a single reference receiver for high-accuracy positioning. Typically, the reference receiver is located relatively close to the rover receiver, so that the GNSS observations made by the reference receiver are affected in almost the same manner by the local ionospheric and/or atmospheric delay and performing differential positioning (see for instance [1], section 6.2) is efficient to obtain a precise position by notably cancelling the errors induced by the ionosphere refraction.

b) The reference stream can take the form of a synthetic or semi-synthetic raw data (compressed or not) generated for a position near the rover position based on observation data from a network of reference stations. This solution is traditionally known as Virtual Reference Station (VRS) (see for instance [1], section 6.3.7). The (semi-) synthetic data is commonly generated based on data observed by a network of reference receivers around or near the location of the rover. FIG. 2 schematically illustrates the use of synthetic/semi-synthetic reference data for high-accuracy positioning.

c) The reference stream can take the form of raw data (modified or not) from a network of reference stations. FIG. 3 schematically illustrates the use of network reference data for high-accuracy positioning.

d) The reference stream can take the form of precise satellite data derived from a network of reference stations. FIG. 4 schematically illustrates the use of precise satellite data for high-accuracy positioning. FIG. 5 schematically illustrates the use of precise satellite data for high-accuracy positioning by means of synthetic reference observation data.

The usage of the different reference stream forms can vary. To analyze the different cases, we can start by considering the rover carrier phase and pseudorange measurements:

$$\Phi_i = \rho + c(dT - dt) + T - I_i + \lambda_i N_i + B_{\Phi,i} - b_{\Phi,i} + M_{\Phi,i} + n_{\Phi,i} \quad (1)$$

and $$P_i = \rho + c(dT - dt) + T - I_i + B_{P,i} - b_{P,i} + M_{P,i} + n_{P,i} \quad (2)$$

where:

$\Phi_i$ $\Phi_i$ is the carrier-phase measurement for frequency i in meters;

$\rho$ is the geometric distance between the antennas of the receiver and satellite in meters;

c is the speed of light constant in meters per second;

dt dT is the receiver clock error in seconds;

dt dt is the satellite clock error in meters per second;

T T is the slant neutral atmosphere delay in meters;

$I_i$ $I_i$ is the ionospheric delay for frequency i in meters;

$\lambda_i$ $\lambda_i$ is the carrier-phase wavelength for frequency i in meters;

$N_i$ $N_i$ is the integer carrier-phase ambiguity for frequency i in cycles;

$B_{\Phi,i}$ $B_{\Phi,i}$ is the carrier-phase receiver bias for frequency i in meters;

$b_{\Phi,i}$ is the carrier-phase satellite bias for frequency i in meters;

$M_{\Phi,i}$ $M_{\Phi,i}$ is the carrier-phase multipath for frequency i in meters;

$n_{\Phi,i}$ is the carrier-phase observation noise and other un-modelled effects for frequency i in meters;

$P_i$ $P_i$ is the pseudorange measurement for frequency i in meters;

$B_{P,i}$ $B_{P,i}$ is the pseudorange receiver bias for frequency i in meters;

$b_{P,i}$ $b_{P,i}$ is the pseudorange satellite bias for frequency i in meters;

$M_{P,i}$ is the pseudorange multipath for frequency i in meters;

$n_{P,i}$ is the pseudorange observation noise and other un-modelled effects for frequency i in meters.

In the equation above, the relationship with the receiver coordinates is established by means of the geometric distance, since:

$$\rho = \sqrt{(X_r - X^s)^2 + (Y_r - Y^s)^2 + (Z_r - Z^s)^2}, \quad (3)$$

where:

$X_r, Y_r, Z_r$ are coordinates of the receiver antenna reference point in the earth-centered, earth fixed (ECEF) coordinate system at the time of signal reception, in meters;

$X^s, Y^s, Z^s$ are coordinates of the satellite center of mass in the ECEF coordinate system at the time of the signal transmission, in meters.

In case the data from a reference receiver is available, the observations of the reference receiver and rover can be differenced in order to cancel the satellite-dependent errors present in equations (1) and (2). The simplified single difference observation model reads:

$$\Delta\Phi_i = \Delta\rho + c\Delta dT + \Delta T - \Delta I_i + \lambda_i \Delta N_i + \Delta B_{\Phi,i} + \Delta M_{\Phi,i} \quad (4),$$

and $$\Delta P_i = \Delta\rho c\Delta dT + \Delta T + \Delta I_i + \Delta B_{P,i} + \Delta M_{P,i} \quad (5)$$

where $\Delta$ stands for operator representing the single difference between observations of the rover receiver and the reference receiver. In this case, all the parameters on the right-hand side of the two equations have to be corrected, estimated, or eliminated through observation combination. For a reference on observation combinations see WO 2011-034616 A2. The so-called ionospheric-free combinations can be used to eliminate the first order ionospheric delays. Geometric-free combinations can be used to eliminate the non-dispersive effects (e.g. troposphere, geometric range, clock errors). The way each of those parameters is handled depends on the setup and configuration of the positioning engine.

If differences between different satellites are performed (i.e., the difference between the observations from two frequencies for a first satellite and the difference between the observations from two frequencies for a second satellite), a double-difference observation equation is obtained. The advantage of performing the double difference operation is the elimination of some receiver-dependent terms in the equations above, thus:

$$\nabla\Delta = \nabla\Delta\rho + \nabla\Delta T - \nabla\Delta I_i + \lambda_i \nabla\Delta N_i + \nabla\Delta M_{\Phi,i}, \quad (6)$$

and $$\nabla\Delta P_i = \nabla\Delta\rho + \nabla\Delta T + \nabla\Delta I_i + \nabla\Delta M_{P,i}, \quad (7)$$

where $\nabla$ is the operator representing the single difference between observations of two satellites.

In the observation differencing approach, provided that the two receivers are not too distant from each other (up to a few hundreds of kilometers), the satellite position errors affecting $X^s$, $Y^s$, $Z^s$ are greatly reduced. The differential effects of the troposphere ($\Delta T$) and the ionosphere ($\Delta I_i$) can also get dramatically reduced for shorter distances between rover and reference receiver/network. The differencing approach (between rover and reference observations), as represented in equations (3) to (6), can be used for:

cases where a physical reference station data is used—this is the case in option (a) (as illustrated in FIG. 1) and some cases of (c) (as illustrated in FIG. 3), namely when raw data from one of the reference stations is used;

cases where a synthetic or semi-synthetic reference data is used—this is the case for (b) (as illustrated in FIG. 2), certain cases of (c) (as illustrated in FIG. 3), and some cases of (d) (as illustrated in FIG. 4 or 5), namely when the precise satellite data correction stream is used to generate synthetic observation data.

With the improvement in the quality of the computed precise satellite orbits and clocks (and later precise observation biases) during the last years (see for instance WO 2011-034616 A2), a different observation model has been used as an alternative to observation differencing. This is the un-differenced observation model (typically given by equation (1)), where the precise satellite information (the satellite position, the satellite clock error, the carrier phase satellite bias, and the pseudorange satellite bias) is used as known quantities, thus:

$$\Phi_i + c \cdot dT + b_{\Phi,i} = \rho + cdT + T - I_i + \lambda_i N_i + B_{\Phi,i} + M_{\Phi,i} + n_{\Phi,i}, \quad (8), \text{ and}$$

$$P_i + c \cdot dt + b_{P,i} = \rho + cdT + T + I_i + B_{P,i} + M_{P,i} + n_{P,i}, \quad (9)$$

where one should consider that in this case the satellite positions $X^s$, $Y^s$, $Z^s$ used for the computation of the geometric distance $\rho$ are known with a reasonable accuracy (typically of the order of 2-5 cm), and therefore the satellite errors do not depend on differencing to be minimized.

The observation model represented by equations (8) and (9) is typically used in positioning engines following the approach shown in FIG. 4, where the precise satellite data is directly used in the positioning engine, being reduced from the observational data. There are yet other ways of using precise satellite data for position computation, including the use of synthetic or semi-synthetic reference observation data. This is the case shown in FIG. 5.

Now that the context and background of the invention, i.e. the usage of reference streams in high-accuracy positioning, has been explained in more detail, let us now describe further embodiments of the invention.

In one embodiment of the invention, a new way of applying the precise satellite data to positioning is demonstrated. The concept presented in this embodiment is the utilization of the precise satellite data to improve satellite data of positioning engines for which other type of reference streams are also used for at least a subset of the satellites. In other words, some embodiments of the invention include positioning techniques where a first reference stream is used to process the observations obtained from a subset of the satellites observed by the rover, while precise satellite data is used to process the observations obtained from another subset of the satellites.

In particular, the integrated use for precise satellite data in high accuracy positioning in embodiments of the invention may be described as follows.

As described above, there are several ways of applying a reference stream to the rover GNSS data in order to obtain accurate position. Furthermore, with the availability of precise satellite data, new ways of computing accurate positions have emerged during the last years (see for instance WO 2011-034616 A2). The common ways of applying precise satellite data to positioning have also been described and typical flows can be seen in FIGS. 4 and 5.

Figure 6:
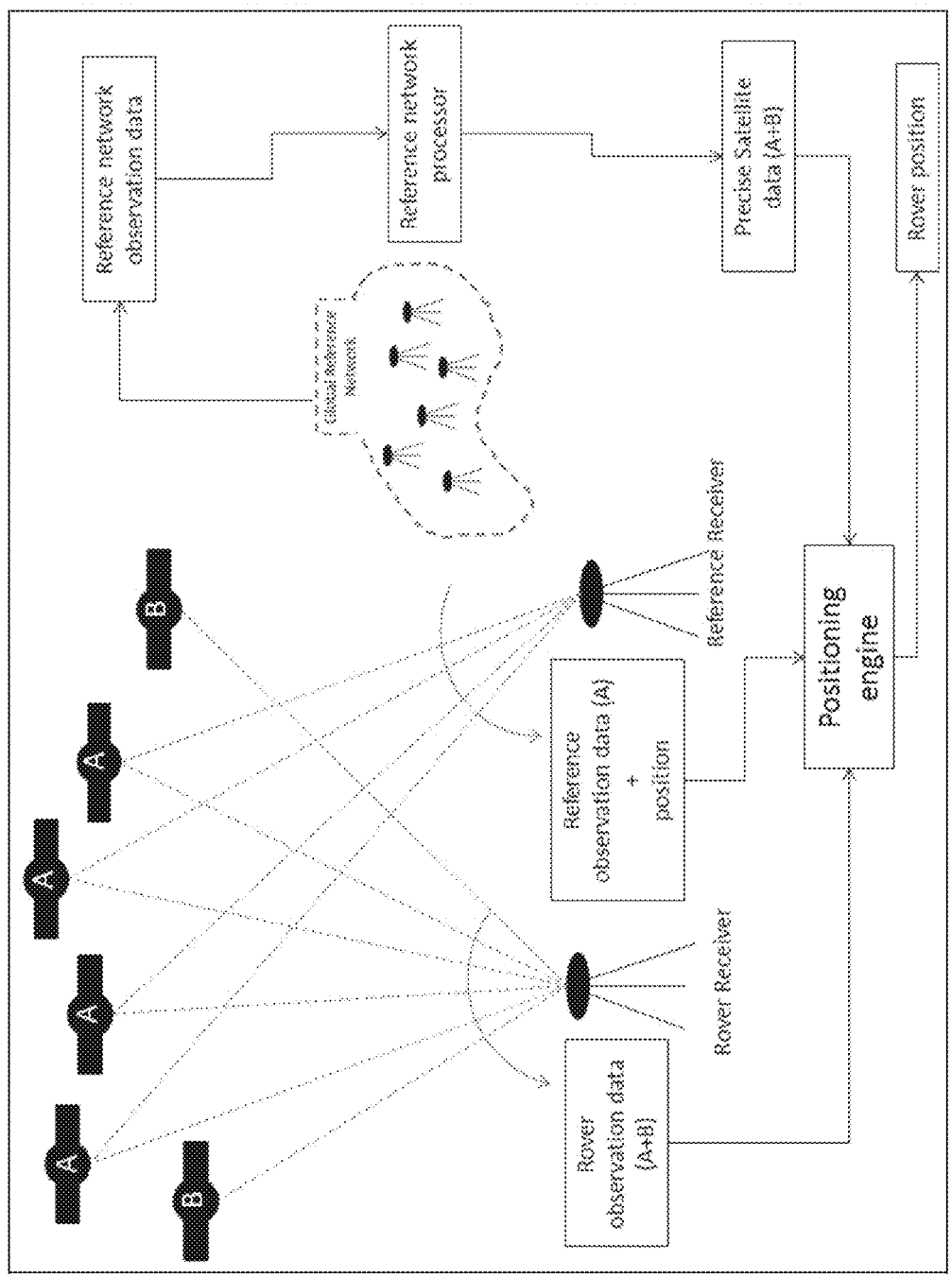
FIGS. 6, 7 and 8 schematically illustrate three systems in three embodiments of the invention, respectively.

FIG. 6 schematically illustrates the integrated precise satellite data usage with single reference receiver operation in one embodiment of the invention.

In particular, FIG. 6 shows a case where the satellite data is blended with reference data from a single reference receiver. In this embodiment, the single reference receiver data is applied to process the observation data obtained from satellites (A) (four satellites are shown on FIG. 6, but it goes without saying that this is only an exemplary number). Precise satellite data (from the global reference network) is available for all satellites in this example. However, it would be enough in the embodiment if precise satellite data would be available only for satellites (B), since these are the satellites for which the observation data will be processed using precise satellite data. The selection of satellite groups A and B can vary for different cases. Some of the possibilities are listed below:

Reference receiver (located at a fixed position) observes only satellites of a given GNSS (e.g. GPS), and precise satellite data is used to process satellites of an additional system (e.g. GLONASS);

Reference receiver has a blockage for part of the sky (e.g. a building, a tree) and thus local correction data is not available for these satellites, and precise satellite data is used to process those satellites on the rover side in the absence of the reference stream correction (i.e., in the absence of local correction data);

Reference receiver has a blockage for part of the sky (e.g. a building, a tree) and does not make local correction data available for these satellites, and precise satellite data is used to process those satellites on the rover side in the absence of the reference stream correction (i.e., in the absence of local correction data);

Rover receiver (or processing station) detects based on quality analysis that reference data (i.e., local correction data) for some satellites is of poor quality and the rover receiver (or processing station) does not use the reference data (i.e., local correction data) for these satellites, and precise satellite data (i.e., global correction data) is used instead to process the GNSS observations received from these satellites;

Reference receiver has a tracking elevation cutoff higher than the rover wants (i.e., is configured) to process data for, and precise satellite data (i.e., global correction data) is used to process the GNSS observations received from lower elevation angle satellites;

Reference tracking network does not provide corrections (i.e., local correction data) for part of the satellites (because e.g. network ambiguities are not fixed yet for it), and precise satellite data (i.e., global correction data) is used instead to process those satellites.

The carrier-phase equation for satellites A could be formulated as follows:

$$\Delta\Phi_i^A = \Delta\rho^A + c\cdot\Delta dT^A + \Delta T^A - \Delta I_i^A + \lambda_i \Delta N_i^A + \Delta B_{\Phi,i}^A + \Delta M_{\Phi,i}^A, \quad (10)$$

where the superscript A indicates that these quantities refer and depend on the reference receiver data (i.e., local correction data) used for forming the single difference observations.

The model for satellites B could be given by:

$$\Phi_i \cdot c\cdot dt + b_{\Phi,i} = \rho^B + c\cdot dT + T - I_i + \lambda_i N_i^B + B_{\Phi,i} + M_{\Phi,i} + n_{\Phi,i}, \quad (11)$$

where the superscript B indicates that these quantities refer and depend on the precise satellite data (i.e., global correction data) used for correcting the rover observations. The terms without superscript indicate quantities that are rover-dependent and theoretically do not suffer direct influence from which reference correction type is being used.

What can be noticed from the two equations above is an important aspect that has to be taken into account to make the integration to work, namely the compatibility of the parameters that are modelled with different reference data types. While the receiver position is expected to be the same for any type of reference stream, it might occur that each of these streams belong to a different reference frame. In other words, it is possible that different reference streams provide different receiver coordinates, in different coordinate systems. Potential differences in reference frame can emerge due to a variety of reasons, ranging from a mistake in the system operation to known differences in the correction stream source frames. Potential frame differences have to be handled by for example:

being accounted for before integrating the streams into the positioning engine—and then in fact a common set of coordinates could be computed for satellites processed with any of the reference streams;

being accounted for during the position computation with the introduction of coordinates offsets that connect the two reference frames (e.g. $\Delta X^{AB}$, $\Delta Y^{AB}$, $\Delta Z^{AB}$).

The other terms have to be similarly handled by for example:

being accounted for before integrating the streams into the positioning engine, so that a single state can be computed for satellite data corrected with either of the streams;

being eliminated by observation combinations such as ionospheric-free or geometric-free combinations;

being estimated as two duplicate independent parameters (e.g. estimating two receiver clock states);

being estimated as a parameter plus a fixed offset between the stream types (similar to the second optional approach suggested for the receiver coordinates);

being estimated as a parameter plus a varying offset, where the offset can be modelled e.g. as a random walk or white noise.

The selection of the appropriate approach depends on the type of parameter, and setup of the processing engine. A single difference operation performed between the GNSS observation from the satellites that are processed with streams of different sources or nature might not eliminate the receiver-dependent effects, as those might be different. This statement does not apply to a potential case where the two streams are made completely compatible before being used in the positioning engine. Such operation would have to assure that all parameters with superscripts A or B in the equations above are consistent between the streams where applicable.

Figure 7:
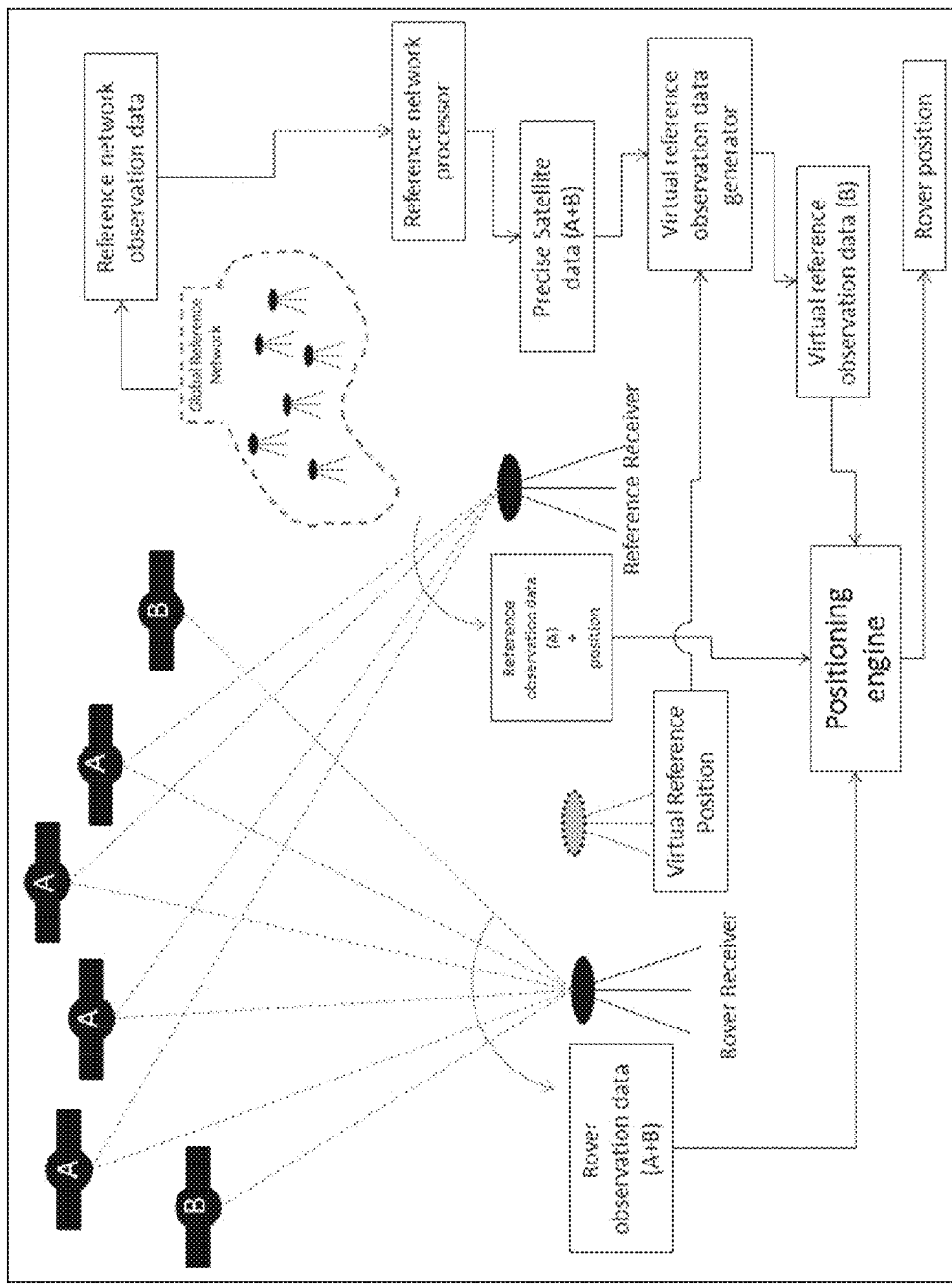

The example of FIG. 6 may also be adapted for the case where the precise satellite data (i.e., global correction data) is being used by means of the generation of synthetic reference observation data. This flow is schematically illustrated in FIG. 7, which schematically illustrates the integrated precise satellite data usage with single reference receiver operation, using synthetic reference data derived from precise satellite data. This corresponds to the creation of a virtual reference station (VRS).

The overall concept shown in FIG. 7 is the same as in the previous case illustrated in FIG. 6, however the satellite B observation model equation would be better written as:

$$\Delta \Phi_i^B = \Delta \rho^B + c \cdot \Delta dT^B + \Delta T^B - \Delta I_i^B + \lambda_i \Delta N_i^B + \Delta B_{\Phi,i}^B + \Delta M_{\Phi,i}^B, \quad (12)$$

where, as before, the superscript B indicates that these quantities refer and depend on the synthetic reference receiver data used for forming the single difference observations. The same restrictions listed before apply to this case.

Figure 8:
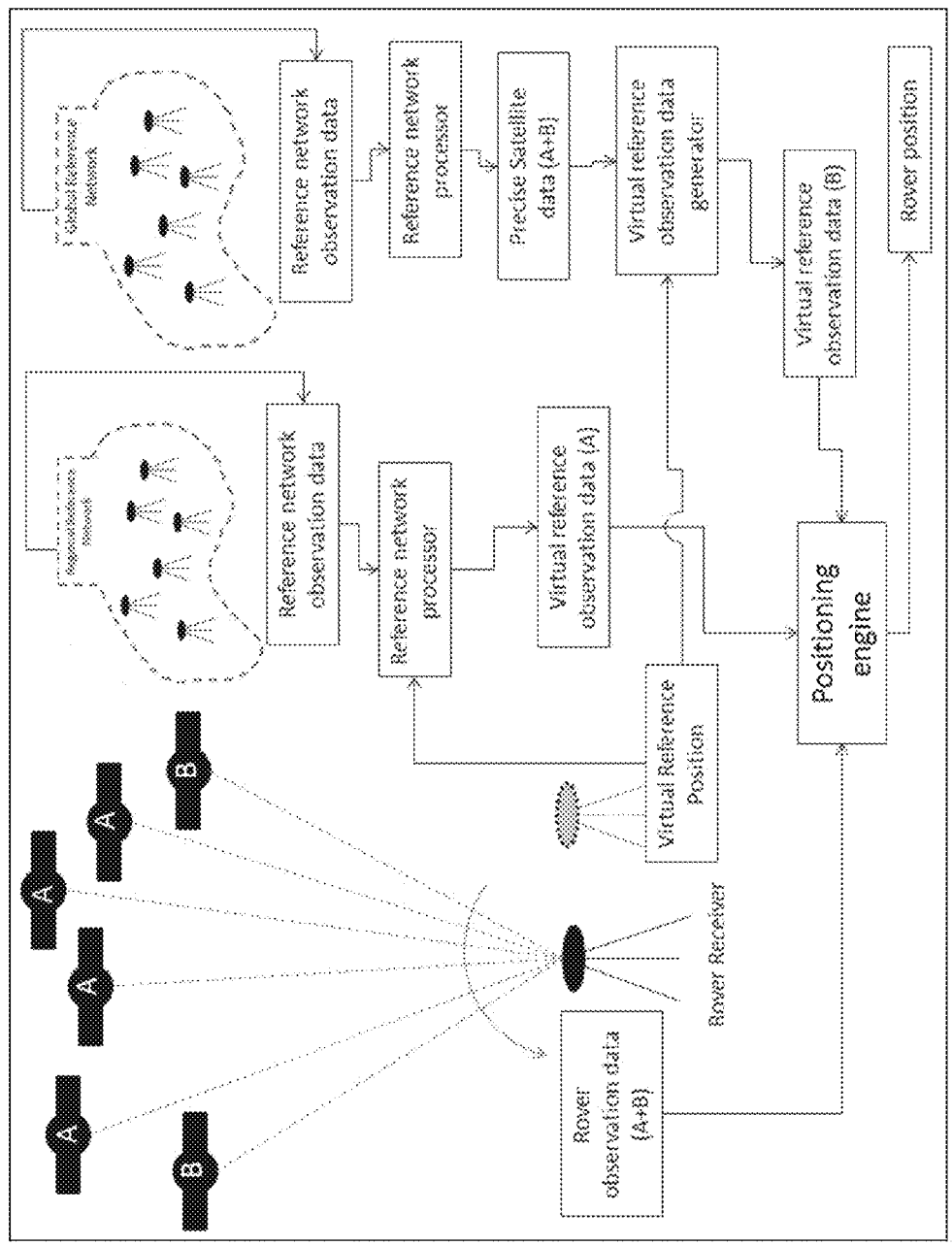

In yet another embodiment, the system may involve two network-based reference streams. FIG. 8 schematically illustrates an embodiment where the positioning engine makes use of GNSS observations from satellites that had their data differenced against reference data generated from (A) a regional reference network data; and (B) precise satellite data derived from a global network. In this embodiment, the virtual reference position is the same for both stream types, but this is not a requirement—the virtual reference observation data could be created for different positions.

FIG. 8 schematically illustrates the integrated precise satellite data usage with single reference receiver operation, using synthetic reference data derived from precise satellite data and regional network.

Any of the above-described apparatuses and their embodiments may be integrated into a rover, a receiver or a network station, and/or the processing methods described can be carried out in a processor which is separate from and even remote from the receivers used to collect the observations (e.g., observation data collected by one or more receivers can be retrieved from storage for post-processing, or observations from multiple network reference stations can be transferred to a network processor for near-real-time processing to generate a correction data stream and/or virtual-reference-station messages which can be transmitted to one or more rovers). Therefore, the invention also relates to a rover, a receiver or a network station including any one of the above apparatuses.

In one embodiment, the receiver of the apparatus of any one of the above-described embodiments is separate from the filters and processing elements. Post-processing and network processing of the observations may notably be performed. That is, the constituent elements of the apparatus for processing of observations does not itself require a receiver. The receiver may be separate from and even owned/operated by a different entity than the entity which is performing the processing. For post-processing, the observations may be retrieved from a set of data which was previously collected and stored, and processed with reference-station data which was previously collected and stored; the processing is conducted for example in an office computer long after the data collection and is thus not real-time. For network processing, multiple reference-station receivers collect observations of the signals from multiple satellites, and this data is supplied to a network processor which may for example generate a correction data stream or which may for example generate a "virtual reference station" correction which is supplied to a rover so that the rover can perform differential processing. The data provided to the rover may be ambiguities determined in the network processor, which the rover may use to speed its position solution, or may be in the form of corrections which the rover applies to improve its position solution. The network is typically operated as a service to rover operators, while the network operator is typically a different entity than the rover operator. This applies to each of the above-described apparatuses and claims.

Now, some results will be discussed.

An exemplary comparison of the positioning performance results between the present invention and methods of the prior art shall now be described with reference to FIGS. 11 to 14.

The rover position of two different rovers (rover A and rover B) located in Iowa, USA was estimated using the method in one embodiment of the present invention and a method of the prior art.

Figure 11:
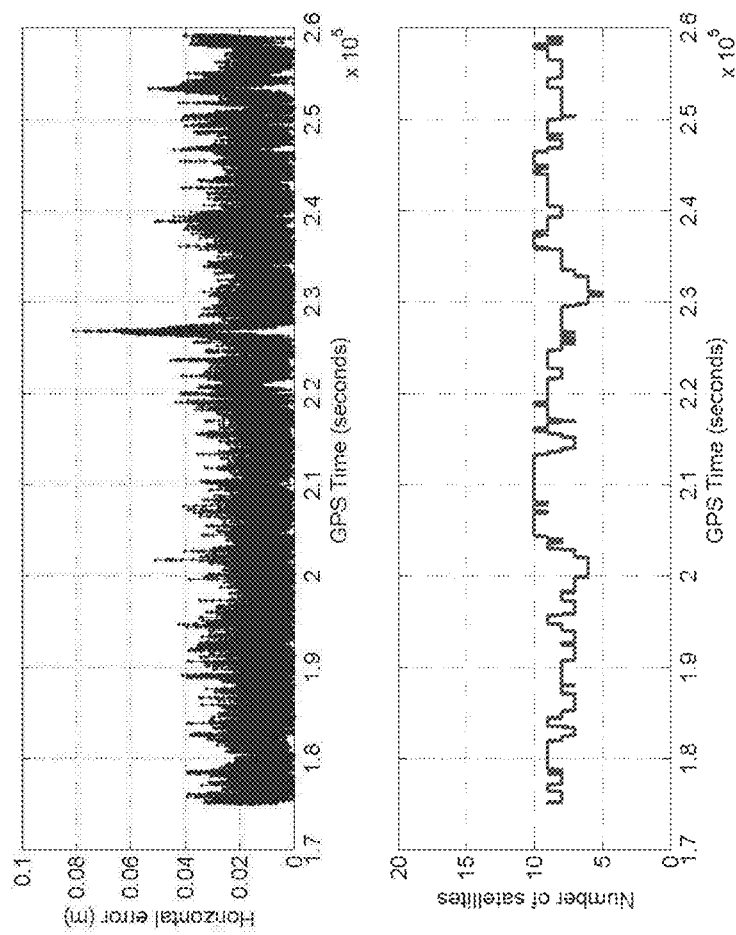
FIG. 11 graphically illustrates the horizontal rover positioning results and the corresponding number of GNSS satellites used for rover A of a method receiving GNSS signals and local correction information in one embodiment of the invention.
Figure 13:
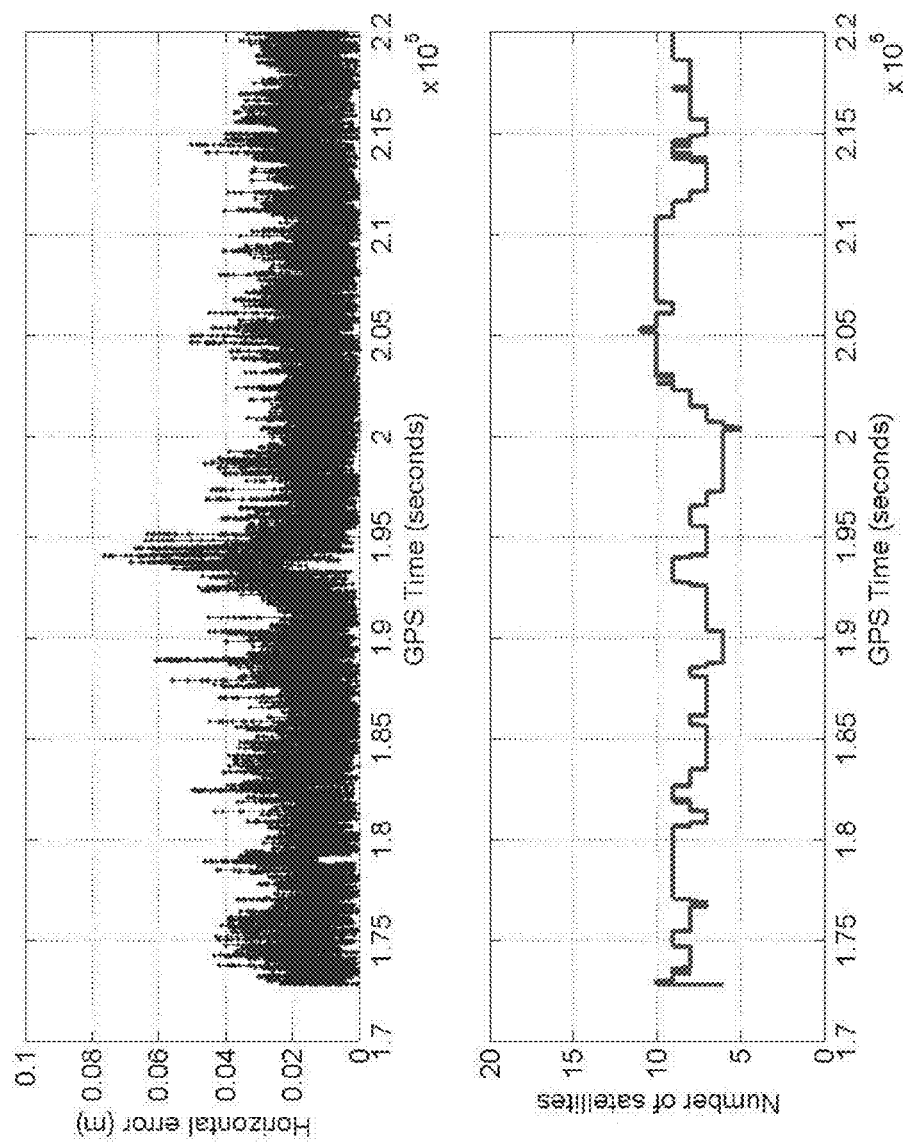
FIG. 13 graphically illustrates the horizontal rover positioning results and the corresponding number of GNSS satellites used for rover B of a method receiving GNSS signals and local correction information in one embodiment of the invention.

The obtained horizontal positioning results of a method receiving GNSS signals and local correction information (method of the prior art) for the rover A and B are shown in FIGS. 11 and 13, respectively.

Figure 12:
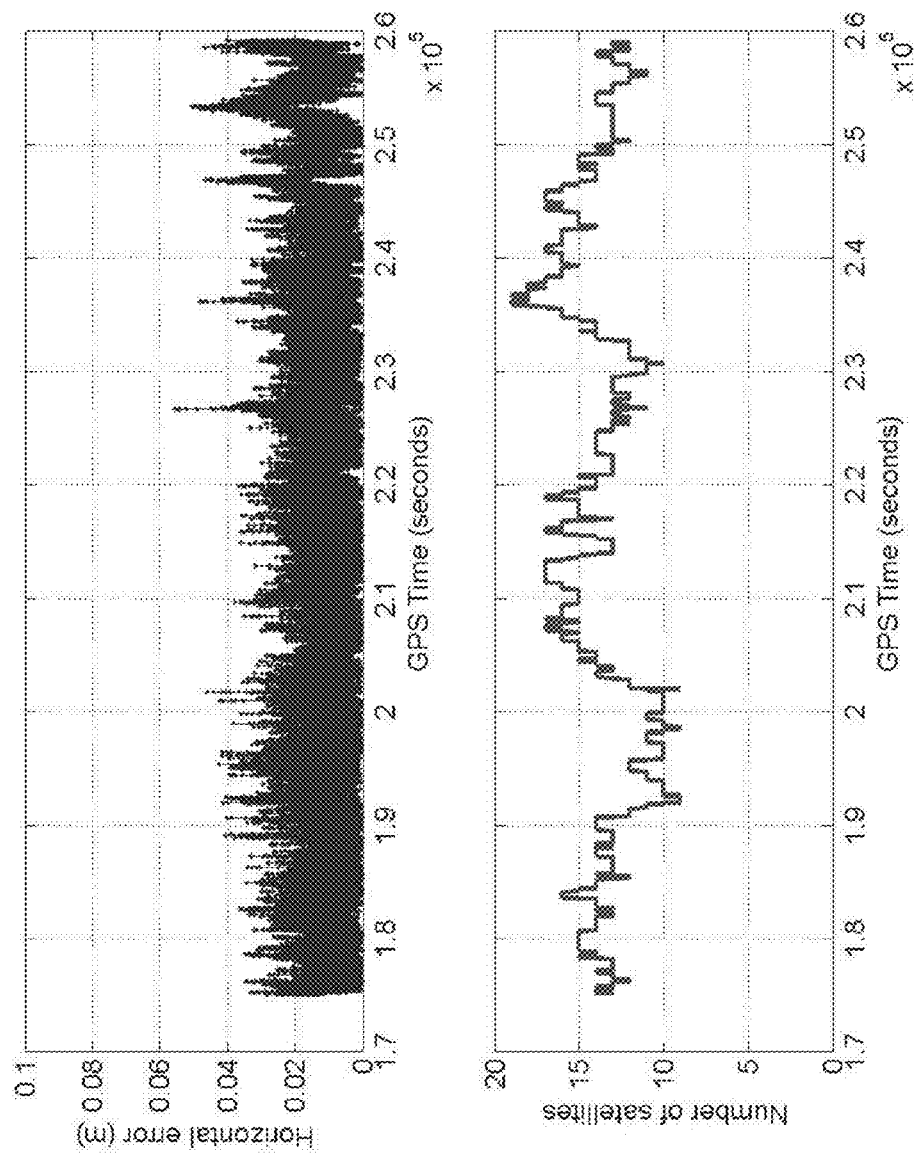
FIG. 12 graphically illustrates the horizontal rover positioning results and the corresponding number of GNSS satellites used for rover A of a method receiving GNSS signals, local correction information and global correction information in one embodiment of the invention.
Figure 14:
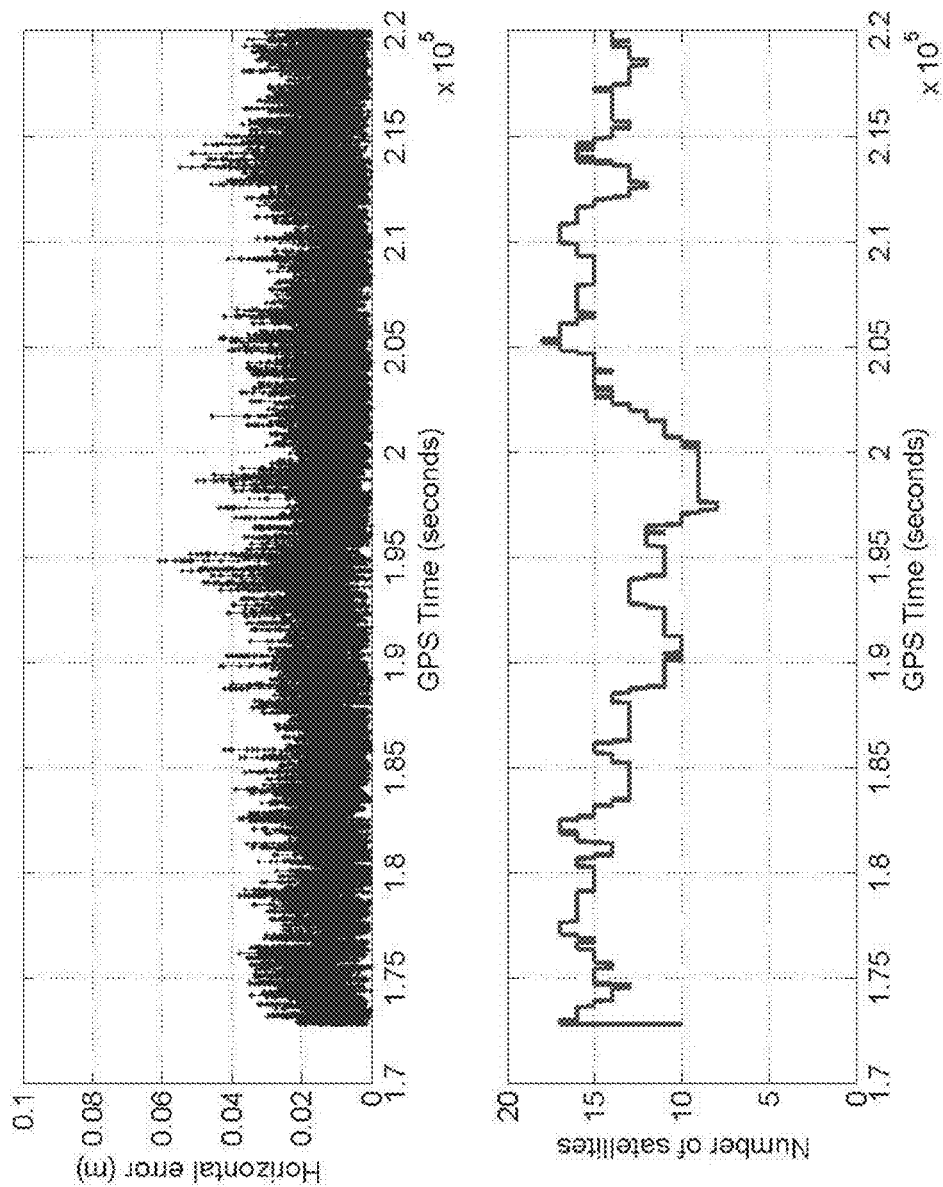
FIG. 14 graphically illustrates the horizontal rover positioning results and the corresponding number of GNSS satellites used for rover B of a method receiving GNSS signals, local correction information and global correction information in one embodiment of the invention.

The obtained horizontal positioning results of a method receiving GNSS signals, local correction information and global correction information (according to one embodiment of the method of the present invention) for the rover A and B are shown in FIGS. 12 and 14, respectively. It is important to notice that the number of GNSS satellites used has increased, in comparison to FIGS. 11 and 13, as the global correction information is now available for a second set of GNSS satellites among the plurality of GNSS satellites.

By comparing directly the results of both methods, it can be seen that the method of the present invention improves the positioning performance in both rovers: the position drifts of about 8 centimeters which occur in the method of the prior art for rover A (at about 227000 GPS time) and for rover B (at about 194500 GPS time) are prevented; a less noisy position is obtained, i.e. the position is more stable and precise.

Any of the above-described methods and their embodiments may be implemented by means of a computer program. The computer program may be loaded on an apparatus, a rover, a receiver or a network station as described above. Therefore, the invention also relates to a computer program, which, when carried out on an apparatus, a rover, a receiver or a network station as described above, carries out any one of the above above-described methods and their embodiments.

The invention also relates to a computer-readable medium or a computer-program product including the above-mentioned computer program. The computer-readable medium or computer-program product may for instance be a magnetic tape, an optical memory disk, a magnetic disk, a magneto-optical disk, a CD ROM, a DVD, a CD, a flash memory unit or the like, wherein the computer program is permanently or temporarily stored. The invention also relates to a computer-readable medium (or to a computer-program product) having computer-executable instructions for carrying out any one of the methods of the invention.

The invention also relates to a firmware update adapted to be installed on receivers already in the field, i.e. a computer program which is delivered to the field as a computer program product. This applies to each of the above-described methods and apparatuses.

GNSS receivers may include an antenna, configured to receive the signals at the frequencies broadcasted by the satellites, processor units, one or more accurate clocks (such as crystal oscillators), one or more computer processing units (CPU), one or more memory units (RAM, ROM, flash memory, or the like), and a display for displaying position information to a user.

Where the terms "receiver", "filter", "processing element" or the like are used herein as units of an apparatus, no restriction is made regarding how distributed the constituent parts of a unit may be. That is, the constituent parts of a unit may be distributed in different software or hardware components or devices for bringing about the intended function. Furthermore, the units may be gathered together for performing their functions by means of a combined, single unit. For instance, the receiver, the filter and the processing element may be combined to form a single unit, to perform the combined functionalities of the units.

The above-mentioned units may be implemented using hardware, software, a combination of hardware and software, pre-programmed ASICs (application-specific integrated circuit), etc. A unit may include a computer processing unit (CPU), a storage unit, input/output (I/O) units, network connection units, etc.

Although the present invention has been described on the basis of detailed examples, the detailed examples only serve to provide the skilled person with a better understanding, and are not intended to limit the scope of the invention. The scope of the invention is much rather defined by the appended claims.

The invention claimed is:

1. Method to estimate parameters derived at least from global navigational satellite system (GNSS) signals useful to determine a position, comprising:
   obtaining at least one GNSS signal observed at a GNSS receiver from each of a plurality of GNSS satellites;
   receiving global correction information useful to correct at least the obtained GNSS signals from a first set of GNSS satellites among the plurality of GNSS satellites, wherein the global correction information includes correction information which is independent from the position to be determined;
   receiving local correction information useful to correct at least the obtained GNSS signals from a second set of GNSS satellites among the plurality of GNSS satellites, wherein the local correction information includes correction information which is dependent on the position to be determined;
   processing the obtained GNSS signals from the first set of GNSS satellites by using the global correction information; and
   processing the obtained GNSS signals from the second set of GNSS satellites by using the local correction information;
   wherein the first set of GNSS satellites is different from the second set of GNSS satellites.

2. Method of claim 1, wherein the local correction information includes at least one of
   a) observed data of a single reference receiver;
   b) synthetic or semi-synthetic raw data generated for a position near the position to be determined, wherein "near" means at least one of: up to a few kilometers, up to 5 kilometers, and up to 10 kilometers; and
   c) raw data from a network of reference stations.

3. Method of claim 1, wherein receiving local correction information includes receiving local correction information from a local source, wherein "local correction information from a local source" means at least one of: correction information generated from data of one or more receivers that are up to a few hundreds of kilometers away from the rover receiver, correction information generated from data of one or more receivers that are up to 500 kilometers away from the rover receiver, and correction information generated from data of one or more receivers that are up to 1000 kilometers away from the rover receiver.

4. Method of claim 3, wherein the local source is any one of a reference station and a reference station network.

5. Method of claim 1, wherein the global correction information includes at least one of
   satellite clock correction;
   satellite orbit correction; and
   satellite code and phase measurement biases.

6. Method of claim 1, wherein the method uses carrier phase measurements of the GNSS signals.

7. Method of claim 6, wherein processing the obtained GNSS signals from the first set of GNSS satellites by using the global correction information includes:
   inputting at least part of the global correction information to a geometry filter configured to output a candidate set of integer ambiguities.

8. Method of claim 7, wherein the method uses carrier phase measurements of the GNSS signals and the candidate sets of integer ambiguities are processed to estimate parameters useful to determine the position.

9. Method of claim 6, wherein processing the obtained GNSS signals from the second set of GNSS satellites by using the local correction information includes:
   inputting at least part of the local correction information to at least one ionospheric filter configured to output a candidate set of integer ambiguities.

10. Method of claim 6, wherein processing the obtained GNSS signals from the second set of GNSS satellites by using the local correction information includes:
    inputting at least part of the local correction information to at least one code carrier filter configured to output a candidate set of integer ambiguities.

11. Method of claim 1, wherein the first set includes the plurality of GNSS satellites from which a GNSS signal is observed by the receiver.

12. Method of claim 1, wherein the second set includes fewer than the plurality of GNSS satellites from which a GNSS signal is observed by the receiver.

13. Apparatus configured to estimate parameters derived at least from global navigational satellite system (GNSS) signals useful to determine a position, comprising:
    an obtaining unit configured for obtaining at least one GNSS signal observed at a GNSS receiver from each of a plurality of GNSS satellites;
    a first receiving unit configured for receiving global correction information useful to correct at least the obtained GNSS signals from a first set of GNSS satellites among the plurality of GNSS satellites, wherein the global correction information includes correction information which is independent from the position to be determined;
    a second receiving unit configured for receiving local correction information useful to correct at least the obtained GNSS signals from a second set of GNSS satellites among the plurality of GNSS satellites, wherein the local correction information includes correction information which is dependent on the position to be determined;
    a first processing unit configured for processing the obtained GNSS signals from the first set of GNSS satellites by using the global correction information; and
    a second processing unit configured for processing the obtained GNSS signals from the second set of GNSS satellites by using the local correction information;
    wherein the first set of GNSS satellites is different from the second set of GNSS satellites.

14. Apparatus of claim 13, wherein the local correction information includes at least one of
    a) raw data of a single reference receiver;
    b) synthetic or semi-synthetic raw data generated for a position near the position to be determined; and
    c) raw data from a network of reference stations.

15. Apparatus of claim 13, wherein the second receiving unit is configured for receiving local correction information from a local source.

16. Apparatus of claim 15, wherein the local source is any one of a reference station and a reference station network.

17. Apparatus of claim 13, wherein the global correction information includes at least one of
satellite clock correction;
satellite orbit correction; and
satellite bias.

18. Apparatus of claim 13, wherein the apparatus uses carrier phase measurements of the GNSS signals.

19. Apparatus of claim 18, wherein the first processing unit is configured for processing the obtained GNSS signals from the first set of GNSS satellites by using the global correction information by:
inputting at least part of the global correction information to a geometry filter configured to output a candidate set of integer ambiguities.

20. Apparatus of claim 19, wherein the apparatus uses carrier phase measurements of the GNSS signals and the candidate sets of integer ambiguities are processed to estimate parameters useful to determine the position.

21. Apparatus of claim 18, wherein the second processing unit is configured for processing the obtained GNSS signals from the second set of GNSS satellites by using the local correction information by:
inputting at least part of the local correction information to at least one ionospheric filter configured to output a candidate set of integer ambiguities.

22. Apparatus of claim 18, wherein the second processing unit is configured for processing the obtained GNSS signals from the second set of GNSS satellites by using the local correction information by:
inputting at least part of the local correction information to at least one code carrier filter configured to output a candidate set of integer ambiguities.

23. Apparatus of claim 13, wherein the first set includes the plurality of GNSS satellites from which a GNSS signal is observed by the receiver.

24. Apparatus of claim 13, wherein the second set includes fewer than the plurality of GNSS satellites from which a GNSS signal is observed by the receiver.

25. A computer program product comprising a non-transitory computer-readable medium configured to store computer-readable instructions, the computer-readable instructions configured, when executed on a computer, to cause the computer to:
obtain at least one GNSS signal observed at a GNSS receiver from each of a plurality of GNSS satellites;
receive global correction information useful to correct at least the obtained GNSS signals from a first set of GNSS satellites among the plurality of GNSS satellites, wherein the global correction information includes correction information which is independent from the position to be determined;
receive local correction information useful to correct at least the obtained GNSS signals from a second set of GNSS satellites among the plurality of GNSS satellites, wherein the local correction information includes correction information which is dependent on the position to be determined;
process the obtained GNSS signals from the first set of GNSS satellites by using the global correction information; and
process the obtained GNSS signals from the second set of GNSS satellites by using the local correction information;
wherein the first set of GNSS satellites is different from the second set of GNSS satellites.

* * * * *